US009035984B2

(12) United States Patent
Aihara et al.

(10) Patent No.: US 9,035,984 B2
(45) Date of Patent: May 19, 2015

(54) PRINTING SYSTEM AND PRINTING APPARATUS

(71) Applicants: Yuichi Aihara, Yamanashi-ken (JP); Naoki Shimizu, Yamanashi-ken (JP); Tomohisa Koike, Yamanashi-ken (JP)

(72) Inventors: Yuichi Aihara, Yamanashi-ken (JP); Naoki Shimizu, Yamanashi-ken (JP); Tomohisa Koike, Yamanashi-ken (JP)

(73) Assignee: NISCA CORPORATION, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 14/446,713

(22) Filed: Jul. 30, 2014

(65) Prior Publication Data

US 2015/0035932 A1 Feb. 5, 2015

(30) Foreign Application Priority Data

Jul. 31, 2013 (JP) ................................ 2013-159039

(51) Int. Cl.
*G01D 15/16* (2006.01)
*B41J 2/325* (2006.01)

(52) U.S. Cl.
CPC ...................................... *B41J 2/325* (2013.01)

(58) Field of Classification Search
USPC .................. 347/171, 172, 213, 214, 216, 217
See application file for complete search history.

(56) References Cited

U.S. PATENT DOCUMENTS

| | | | | |
|---|---|---|---|---|
| 6,803,936 | B2 | 10/2004 | Odaka et al. | |
| 2004/0207714 | A1 * | 10/2004 | Takahashi et al. | 347/216 |

FOREIGN PATENT DOCUMENTS

| | | | | |
|---|---|---|---|---|
| JP | 2003-326865 | A | | 11/2003 |
| JP | 2003326865 | A | * | 11/2003 |
| JP | 2010-089300 | A | | 4/2010 |

* cited by examiner

*Primary Examiner* — Sarah Al Hashimi
(74) *Attorney, Agent, or Firm* — Manabu Kanesaka

(57) ABSTRACT

A printing system and printing apparatus are provided with improvements in the image quality of an image formed on a printing medium, a peel off region (PO) wherein a transfer layer of a transfer film is not transferred is set corresponding to a card, modified printing data is generated by modifying a gray-scale value of printing data inside a region that is larger than the PO region by predetermined dimensions and including the PO region in the printing data of Y, M, C and Bk into a gray-scale value of 0, an image is formed on the transfer film by heating a thermal head for an image formation panel of an ink ribbon according to the modified printing data. The transfer layer is peeled off by heating the thermal head for a peel off panel of the ink ribbon according to position information of the PO region.

7 Claims, 22 Drawing Sheets

PRINTING SYSTEM AND PRINTING APPARATUS

RELATED APPLICATIONS

The present application is based on, and claims priority from Japanese Application No. 2013-159039, filed Jul. 31, 2013, the disclosure of which is hereby incorporated by reference herein in its entirety.

TECHNICAL FIELD

The present invention relates to a printing system and printing apparatus, and more particularly, to a printing apparatus that forms an image on an intermediate transfer medium using an ink ribbon in which are disposed image formation panels and peel off panels and that transfers the image to a printing medium, and a printing system provided with the printing apparatus and a host computer.

BACKGROUND ART

Conventionally, such a printing apparatus has been known widely that forms an image such as a photograph of face and character information on a printing medium such as aplastic card. In such a printing apparatus, for example, an image (mirror image) is formed on a transfer film (intermediate transfer medium) with a thermal head via an ink ribbon, and next the image formed on the transfer film is transferred to a printing medium.

Generally, this type of printing apparatus constitutes a printing system together with a host computer. On a hard disk of the host computer is installed object generation application software for generating a desired image object corresponding to a printing medium, and when necessary, a printer driver for generating printing data for the printing apparatus from the image object, and the image objector printing data generated on the host computer side is delivered to the printing apparatus side (for example, see Patent Document 1).

In addition, on the printing medium exist regions such as a magnetic stripe arrangement area, IC storage area (particularly, contact type IC terminal area) and a signature field of an owner to which a transfer layer of the transfer film should not be transferred. When the transfer layer of the transfer film is transferred to the magnetic stripe arrangement area or the contact type IC storage area, there is the risk that a functional disorder occurs in the printing medium, and when the transfer layer of the transfer film is transferred to the signature field, it is difficult for the owner to sign in trying to sign.

To solve the problem, for example, Patent Document 2 discloses techniques for forming an image on a transfer film with an image formation panel of Y (Yellow), M (Magenta), C (Cyan) and Bk (Black) using an ink ribbon in which are disposed image formation panels and peel off panels, peeling off (an image of) a transfer layer in a region that should not be transferred to a recording medium in the image formed on the transfer film, and then, transferring the image with the transfer layer peeled off formed on the transfer film to a printing medium.

PRIOR ART DOCUMENT

Patent Document

[Patent Document 1] Japanese Unexamined Patent Publication No. 2010-089300 (see paragraphs [0056] to [0059], and paragraphs [0065] and [0066])

[Patent Document 2] Japanese Unexamined Patent Publication No. 2003-326865 (see paragraphs [0031] and [0031], and FIGS. 1 to 3)

DISCLOSURE OF INVENTION

Problems to be Solved by the Invention

The techniques of Patent Document 2 as described above are to peel off the transfer layer in a predetermined region of the transfer film that should not be transferred to the recording medium with the peel off panel, do thereby not impair functions of the magnetic stripe and contact type IC, enable a signature to be made smoothly, and are thus excellent techniques. However, since an image is once formed with Y, B, C, Bk and the like in a predetermined region of the transfer film that should not be transferred to the recording medium and the transfer layer in the predetermined region is peeled off with the peel off panel, there is the risk that boundaries with images in the periphery of the peeled region become jagged (see FIG. 23A), and the image quality of the image formed on the recording medium is susceptible to improvement.

In view of the above-mentioned matter, it is an object of the present invention to provide a printing system and printing apparatus provided with improvements in the image quality of an image formed on a printing medium.

Means for Solving the Problem

To attain the above-mentioned object, in a first aspect of the present invention, a printing system, which is provided with a printing apparatus that forms an image on an intermediate transfer medium using an ink ribbon in which are disposed an image formation panel and a peel off panel and that transfers the image to a printing medium and a host computer, is provided with an object generation/non-transfer region setting device for generating a desired image object corresponding to the printing medium and setting a non-transfer region indicating that a transfer layer of the intermediate transfer medium is not transferred to the printing medium inside a region of the image object, a converting device for converting the image object generated in the object generation/non-transfer region setting device into printing data, a modified printing data generating device for generating modified printing data by modifying, in the printing data converted in the converting device, a gray-scale value of printing data inside the non-transfer region set by the object generation/non-transfer region setting device, printing data inside a region that is larger than the non-transfer region by a predetermined dimension and that includes the non-transfer region, or printing data of a region larger than the non-transfer region by a predetermined dimension to a predetermined gray-scale value or less, or modifying a gray-scale value of the printing data inside the non-transfer region to a predetermined gray-scale value or less while performing gradation processing in a region larger than the non-transfer region by a predetermined dimension, a printing section that has a thermal head with a plurality of heating elements lined and that peels off a transfer layer of the intermediate transfer medium by selectively heating the heating elements for the peel off panel according to position information of the non-transfer region set by the object generation/non-transfer region setting device after forming an image on the intermediate transfer medium by selectively heating the heating elements for the image formation panel according to the modified printing data generated in the modified printing data generating device or before forming the image, and a transfer section that transfers, to the printing medium, an image with the transfer layer peeled off formed on the intermediate transfer medium in the printing section.

In the first aspect, an operator generates a desired image object corresponding to a printing medium using the object generation/non-transfer region setting device. Further, by obtaining assistance from the object generation/non-transfer region setting device, in generating the image object, the operator sets the non-transfer region indicating that the transfer layer of the intermediate transfer medium is not transferred to the printing medium inside the region of the image object. The converting device converts the image object generated in the object generation/non-transfer region setting device into printing data. Next, the modified printing data generating device generates modified printing data by modifying, in the printing data converted in the converting device, a gray-scale value of a) printing data inside the non-transfer region set by the object generation/non-transfer region setting device, b) printing data inside a region that is larger than the non-transfer region by a predetermined dimension and that includes the non-transfer region, or c) printing data of a region larger than the non-transfer region by a predetermined dimension to a predetermined gray-scale value or less, or d) modifying a gray-scale value of the printing data inside the non-transfer region to a predetermined gray-scale value or less while performing gradation processing in a region larger than the non-transfer region by a predetermined dimension. Next, the printing section selectively heats heating elements for the image formation panel according to the modified printing data generated in the modified printing data generating device to form an image on the intermediate transfer medium. In the modified printing data, the gray-scale value of the printing data of the predetermined region (inside the non-predetermined region in (a) and d), inside the region that is larger than the non-transfer region by a predetermined dimension and that includes the non-transfer region in b), and the region larger than the non-transfer region by a predetermined dimension in c)) to a predetermined gray scale value or less, and therefore, image formation with the image formation panel is not performed in a region of the intermediate transfer medium corresponding to the predetermined region modified in the printing data. Further, the printing section peels off a transfer layer of the intermediate transfer medium by selectively heating the heating elements for the peel off panel according to position information of the non-transfer region set by the object generation/non-transfer region setting device, after forming an image on the intermediate transfer medium or before forming the image. The description is given to the relationship between the region (peel off region) in which the transfer layer of the intermediate transfer medium is peeled off with the peel off panel and the region (non-printing region) in which image formation is not performed with the image formation panel. On the intermediate transfer medium, the peel off region and the non-printing region are the same (overlap) in above-mentioned a) and d), the non-printing region is larger than the peel off region (the peel off region is included in the non-printing region) in above-mentioned b), and the non-printing region adjoins to the outside the peel off region in above-mentioned c). Then, the transfer section transfers, to a printing medium, an image with the transfer layer peeled off formed on the intermediate transfer medium in the printing section.

In addition, the object generation/non-transfer region setting device may be disposed on the printing apparatus side, and with consideration given to operability, processing speed and the like, is preferably disposed on the host computer side. The converting device may be disposed on either the printing apparatus side or the host computer side. The modified printing data generating device is disposed on the printing apparatus side when the converting device is disposed on the printing apparatus side, and may be disposed on either the printing apparatus side or the host computer side when the converting device is disposed on the host computer side.

In the first aspect, the modified printing data generating device may modify the gray-scale value of the printing data inside the non-transfer region, the printing data inside the region that is larger than the non-transfer region by a predetermined dimension and that includes the non-transfer region, or the printing data of the region larger than the non-transfer region by a predetermined dimension to a gray-scale value of 0. Further, the modified printing data generating device may perform gradation processing by setting a gray-scale value of printing data on a boundary of the region adjacent to the side opposite to the non-transfer region of the region larger than the non-transfer region by a predetermined dimension to be smaller toward the modified gray-scale value gradually or stepwise. Furthermore, the system is further provided with a storage device for beforehand storing the relationship between a type of recording medium and the non-transfer region corresponding to the type of recording medium, and the object generation/non-transfer region setting device may set the non-transfer region from the relationship stored in the storage device corresponding to the type of recording medium.

Further, in the ink ribbon are disposed the image formation panel having a plurality of color panels and a Bk (Black) panel and the peel off panel, and the converting device converts the image object with R (Red), G (Green) and B (Blue) as color components into the printing data with Y (Yellow), M (Magenta) and C (Cyan) each as a color component, and may perform dither conversion on the image object with Bk as a color component. At this point, in converting into the printing data with Y, M and C each as a color component, the converting device may further perform edge enhancement conversion.

Furthermore, to attain the above-mentioned object, in a second aspect of the present invention, a printing apparatus that forms an image on an intermediate transfer medium using an ink ribbon in which are disposed an image formation panel and a peel off panel and that transfers the image to a printing medium is provided with a storage device for storing input printing data and position information of a non-transfer region indicating that a transfer layer of the intermediate transfer medium is not transferred to the printing medium corresponding to the printing data, a modified printing data generating device for generating modified printing data by modifying, in the printing data stored in the storage device, a gray-scale value of printing data inside the non-transfer region, printing data inside a region that is larger than the non-transfer region by a predetermined dimension and that includes the non-transfer region, or printing data of a region larger than the non-transfer region by a predetermined dimension to a predetermined gray-scale value or less, or modifying a gray-scale value of the printing data inside the non-transfer region to a predetermined gray-scale value or less while performing gradation processing in a region larger than the non-transfer region by a predetermined dimension, according to the position information of the non-transfer region stored in the storage device, a printing section that has a thermal head with a plurality of heating elements lined and that peels off a transfer layer of the intermediate transfer medium by selectively heating the heating elements for the peel off panel according to the position information of the non-transfer region stored in the storage device after forming an image on the intermediate transfer medium by selectively heating the heating elements for the image formation panel according to the modified printing data generated in the modified printing data generating device or before forming the image, and a transfer section that transfers, to the printing medium, an image with the transfer layer peeled off formed on the intermediate transfer medium in the printing section.

In the second aspect, the printing apparatus is provided with the storage device, and the storage device stores the input printing data and the position information of the non-transfer region indicating that a transfer layer of the intermediate transfer medium is not transferred to the printing medium corresponding to the printing data. Then, as in the first aspect, the modified printing data generating device generates the modified printing data, the printing section performs image formation/peeling of the transfer film on the intermediate transfer medium, and the transfer section transfers the image formed on the intermediate transfer medium to the printing medium. The second aspect also exerts the same effects as in the first aspect.

Advantageous Effect of the Invention

According to the present invention, since in the modified printing data generated in the modified printing data generating device, a gray-scale value of printing data of a predetermined region (non-printing region) is modified to a predetermined gray-scale value or less, when the printing section forms an image on the intermediate transfer medium with the image formation panel, image formation with the image formation panel is not performed in a region of the intermediate transfer medium corresponding to the non-printing region. Further, when the printing section peels off the transfer layer of the intermediate transfer medium with the peel off panel of the ink ribbon, since the region (peel off region) of the transfer layer to peel off is smaller or the same as the non-printing region, or is adjacent to the non-printing region, image formation is not performed in the peel off region or in the periphery thereof, and the region to peel off with the peel off panel is made easy to peel off. Therefore, it is possible to obtain the effects of preventing the occurrence of jaggies on the boundary with the image in the periphery of the peeled region on the intermediate transfer medium, and enabling the image quality of the printing medium to be improved after transferring the image formed on the intermediate transfer medium in the transfer section.

BRIEF DESCRIPTION OF DRAWINGS

FIG. 20A illustrates the relationship in this Embodiment, FIG. 20B illustrates the relationship in Modification 1, and FIG. 20C illustrates the relationship in Modification 2;

FIG. 23A illustrates Problem 1 of a conventional example, FIG. 23B illustrates Problem 2 of the conventional example, FIG. 23C illustrates this Embodiment, FIG. 23D illustrates Modification 1, FIG. 23E illustrates Modification 2, and FIG. 23F illustrates Modification 3.

MODE FOR CARRYING OUT THE INVENTION

With reference to drawings, described below is an Embodiment in which the present invention is applied to a printing system for printing and recording text and image on a card, while performing magnetic or electric information recording on the card.

<System Configuration>

Figure 1:
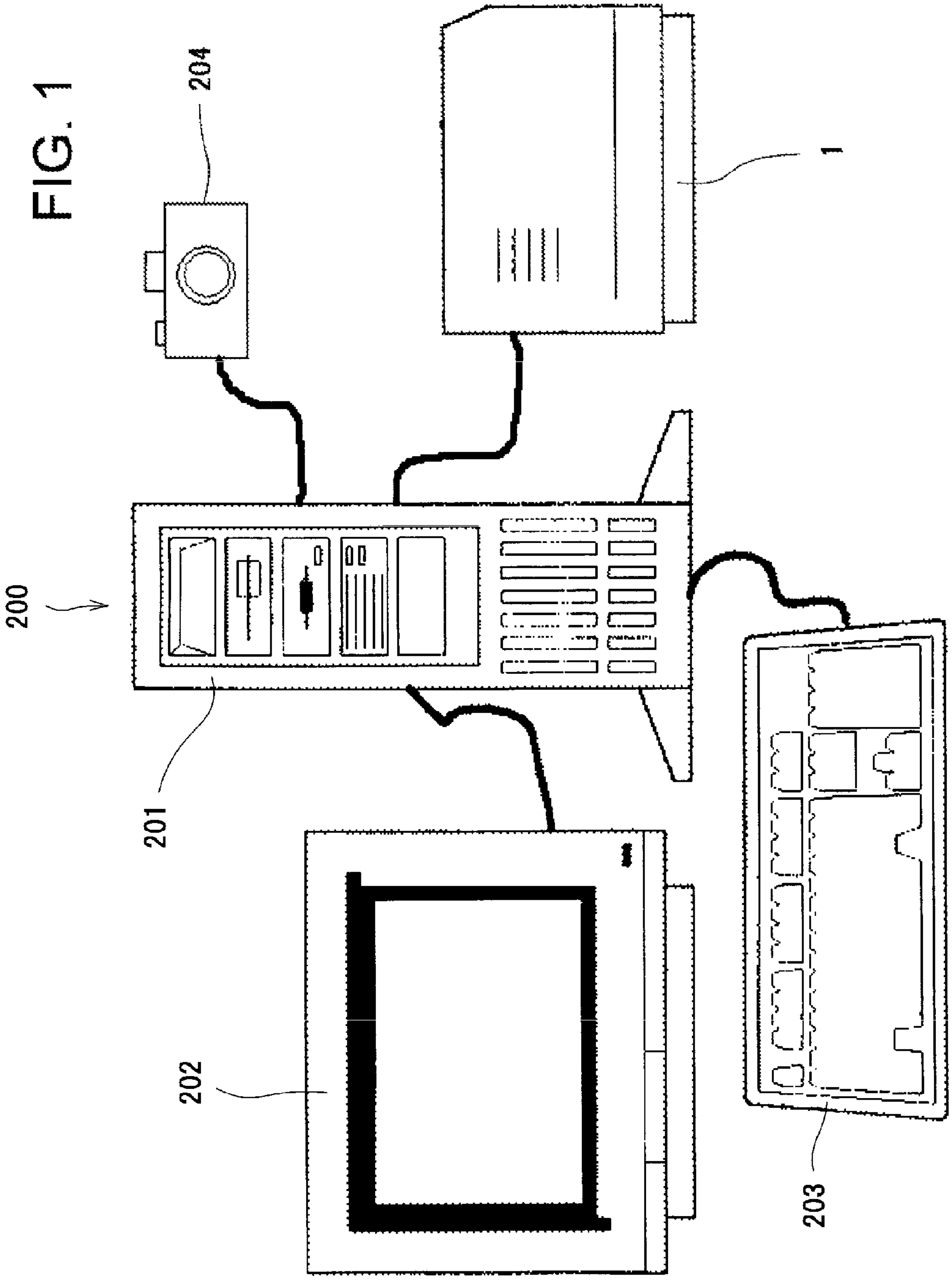
FIG. 1 is an outside view of a printing system including a printing apparatus of an Embodiment to which the present invention is applicable.
Figure 14:
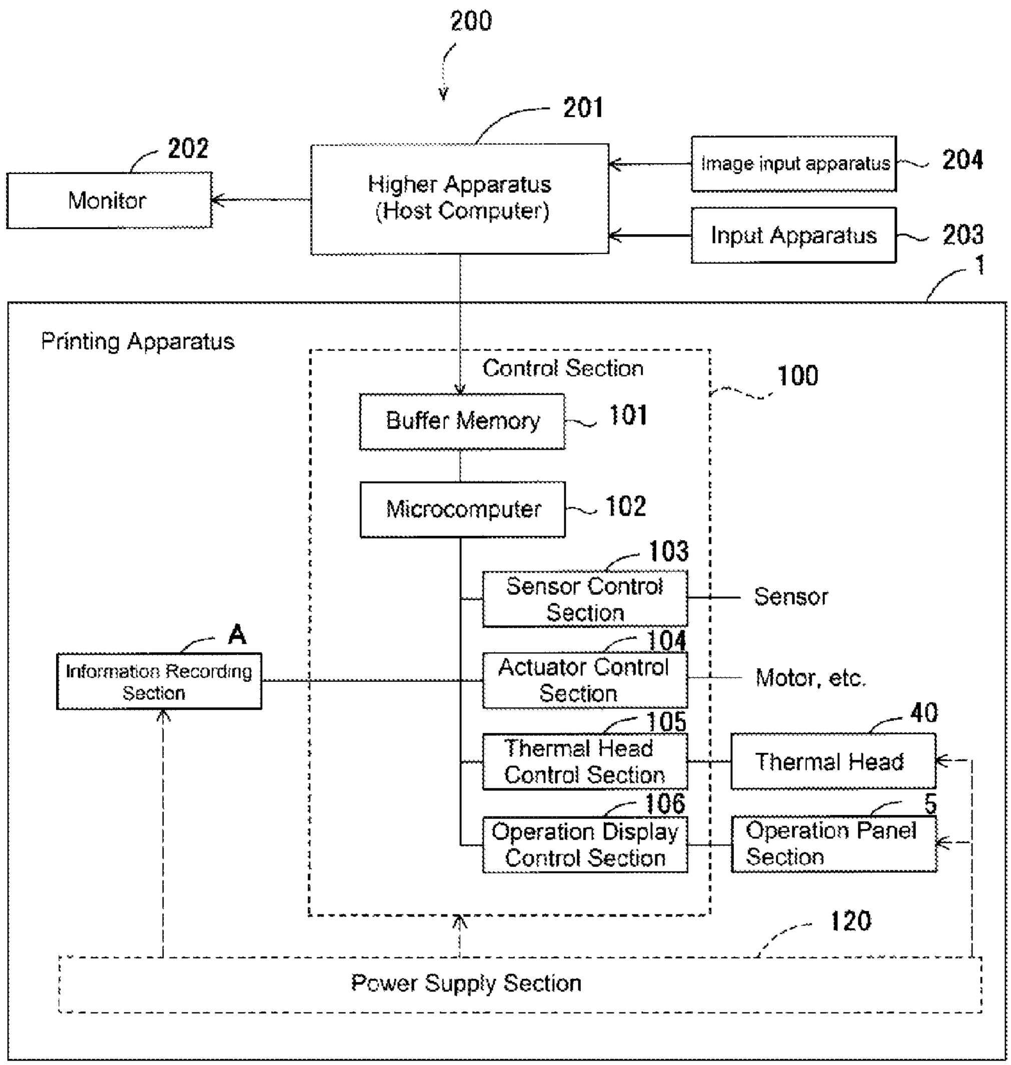
FIG. 14 is a block diagram illustrating a schematic configuration of a control section in the printing apparatus of the Embodiment.

As shown in FIGS. 1 and 14, a printing system 200 of this Embodiment is broadly comprised of a higher apparatus 201 (for example, host computer such as a personal computer), and a printing apparatus 1.

The printing apparatus 1 is connected to the higher apparatus 201 via an interface with the figure omitted, and the higher apparatus 201 is capable of transmitting printing data, magnetic or electric recording data and the like to the printing apparatus 1 to indicate recording operation and the like. In addition, the printing apparatus 1 has an operation panel section (operation display section) 5 (see FIG. 14), and as well as recording operation indication from the higher apparatus 201, recording operation is also capable of being indicated from the operation panel section 5.

The higher apparatus 201 is connected to an image input apparatus 204 such as a digital camera and scanner, an input apparatus 203 such as a keyboard and mouse to input commands and data to the higher apparatus 201, and a monitor 202 such as a liquid crystal display to display data and the like generated in the higher apparatus 201. In addition, on a hard disk of the higher apparatus 201 is installed object generation application software and a printer driver as described later.

<Printing Apparatus>

Figure 2:
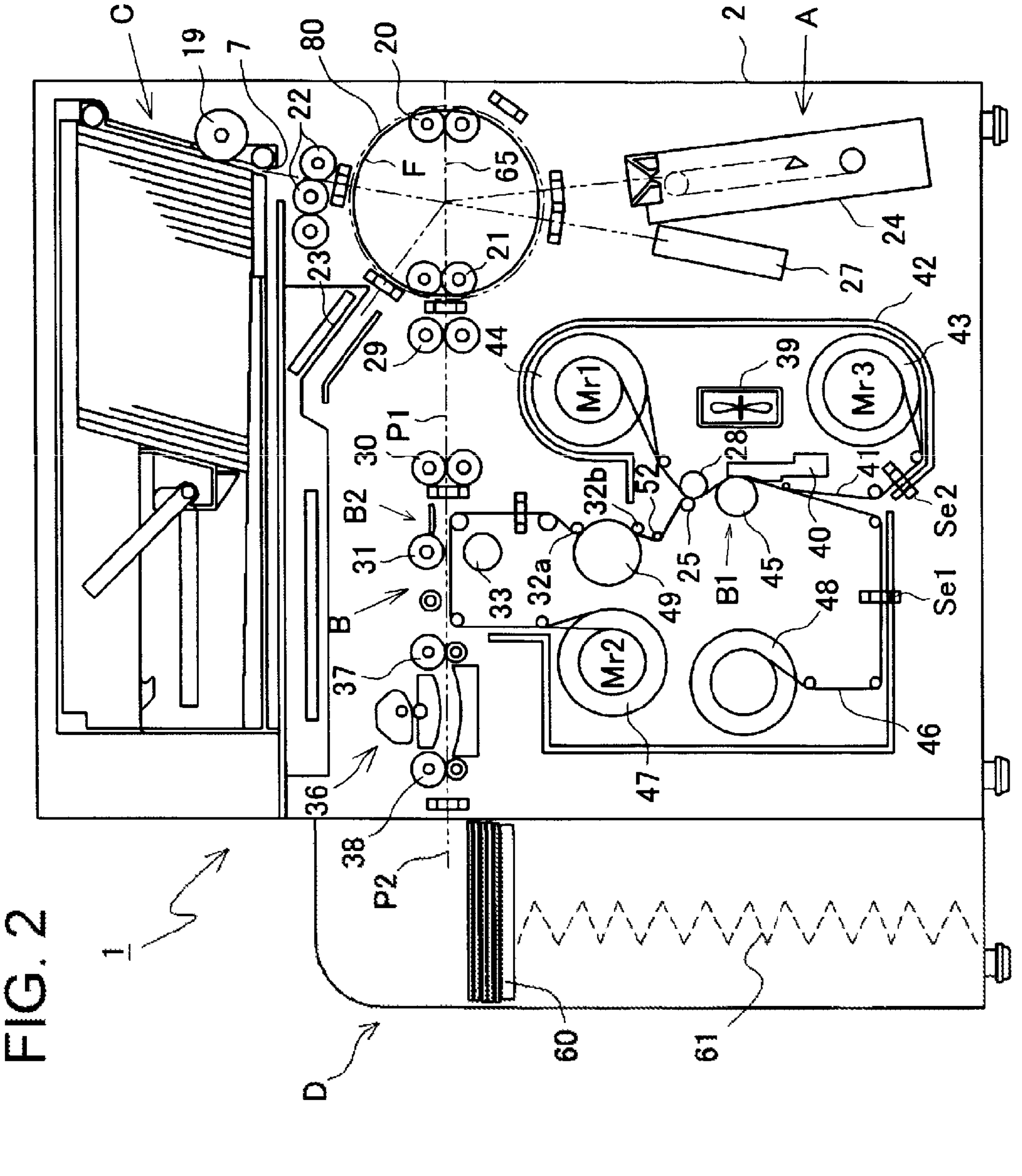
FIG. 2 is a schematic configuration view of the printing apparatus of the Embodiment.

As shown in FIG. 2, the printing apparatus 1 has a housing 2, and the housing 2 is provided with an information recording section A, image formation section B, media storage section C and storage section D.

The information recording section A is comprised of a magnetic recording section 24, non-contact type IC recording section 23, and contact type IC recording section 27.

The media storage section C aligns and stores a plurality of cards in a standing posture, is provided at its front end with a separation opening 7, and feeds and supplies starting with the card in the front row with a pickup roller 19.

The fed card Ca (also see FIG. 20A) is first sent to a reverse unit F with carry-in rollers 22. The reverse unit F is comprised of a rotating frame 80 bearing-supported by the housing 2 to be turnable, and two roller pairs 20, 21 supported on the frame. Then, the roller pairs 20, 21 are axially supported by the rotating frame 80 to be rotatable.

Around the reverse unit F in the turn direction are disposed the magnetic recording section 24, non-contact type IC recording section 23, and contact type IC recording section 27. Then, the roller pairs 20, 21 form a medium carry-in path 65 for carrying in toward one of the information recording sections 23, 24 and 27, and data is magnetically or electrically written on the card Ca in the recording sections.

The image formation section B is to form an image such as a photograph of face and character data on frontside and backside of the card Ca, and a medium transport path P1 for carrying the card Ca is provided on an extension of the medium carry-in path 65. Further, in the medium transport path P1 are disposed transport rollers 29, 30 that transport the card Ca, and the rollers are coupled to a transport motor not shown.

The image formation section B is provided with a film-shaped medium transport apparatus, a printing section B1 that first prints an image, with a thermal head 40, on a transfer film 46 transported with the transport apparatus, and a transfer section B2 that subsequently transfers the image formed on the transfer film 46 to the card Ca existing in the medium transport path P1 with a heat roller 33.

On the downstream side of the image formation section B is provided a medium transport path P2 for carrying the printed card Ca to a storage stacker 60. In the medium transport path P2 are disposed transport rollers 37, 38 that transport the card Ca, and the rollers are coupled to a transport motor not shown.

A decurl mechanism 36 is disposed in between the transport roller 37 and the transport roller 38, presses the card center portion held between the transport rollers 37, 38, and thereby corrects curl generated by thermal transfer with the heat roller 33. Therefore, the decurl mechanism 36 is configured to be able to shift to positions in the vertical direction as viewed in FIG. 2 by an up-and-down mechanism such as a cam not shown.

The storage section D is configured to store cards Ca sent from the image formation section B in the storage stacker 60. The storage stacker 60 is configured to shift downward in FIG. 2 with an up-and-down mechanism 61.

The image formation section B in the entire configuration of the above-mentioned printing apparatus 1 will be further described specifically.

The transfer film 46 is wound around each of a wind-up roll 47 and feed roll 48 of a transfer film cassette rotated by driving a motor Mr2. A film transport roller 49 is a main driving roller for carrying the transfer film 46, and a transport amount and transport halt position of the transfer film 46 is determined by controlling driving of the roller 49. The film transport roller 49 is coupled to a stepping motor not shown. The motor Mr2 is also driven at the time of driving the film transport roller 49, is for the wind-up roll 47 to reel the fed transfer film 46, and is not driven as main transport of the transfer film 46.

Pinch rollers 32*a* and 32*b* are disposed on the periphery of the film transport roller 49. Although not shown in FIG. 2, the pinch rollers 32*a* and 32*b* are configured to be movable to move and retract with respect to the film transport roller 49, and in a state in the figure, the rollers move to the film transport roller 49 to come into press-contact, and thereby wind the transfer film 46 around the film transport roller 49. By this means, the transfer film 46 undergoes accurate transport by a distance corresponding to the number of revolutions of the film transport roller 49.

An ink ribbon 41 is stored in an ink ribbon cassette 42, a supply spool 43 for supplying the ink ribbon 41 and wind-up spool 44 for winding the ink ribbon 41 are stored in the cassette 42, the wind-up spool 44 is driven with a motor Mr1, and the supply spool 43 is driven with a motor Mr3. Forward-backward rotatable DC motors are used for the motors Mr1 and Mr3. Further, “Se2” shown in FIG. 2 denotes a transmission sensor to detect an empty mark indicative of a use limit of the ink ribbon 41 attached to the end portion of the ink ribbon 41. The ink ribbon 41 is formed by repeating an image formation panel having color ribbon panels of Y (Yellow), M (Magenta), C (Cyan) and Bk (Black) ribbon panels, and a peel off panel (PO) to peel off a transfer layer of a predetermined region (PO region described later) of the transfer film 46 in a face sequential manner in the longitudinal direction (see FIG. 22.).

A platen roller 45 and thermal head 40 form the printing section B1, and the thermal head 40 is disposed in a position opposed to the platen roller 45. The thermal head 40 has a plurality of heating elements lined in the main scanning direction, and these heating elements are selectively heated and controlled by a head control IC (not shown) according to printing data, and an image is printed on the transfer film 46 using the sublimation ink ribbon 41. Further, these heating elements are also selectively heated and controlled in peeling off a transfer layer of a predetermined region of the transfer film 46 with the peel off panel (PO) based on position information of the set PO region, as described later (see FIG. 22). In addition, a cooling fan 39 is to cool the thermal head 40.

The ink ribbon 41 with which printing on the transfer film 46 is finished is peeled off from the transfer film 46 with a peeling roller 25 and peeling member 28. The peeling member 28 is fixed to the cassette 42, the peeling roller 25 comes into contact with the peeling member 28 in printing, and the roller 25 and member 28 nip the transfer film 46 and ink ribbon 41 to peel. Then, the peeled ink ribbon 41 is wound around the wind-up spool 44 by driving the motor Mr1, and the transfer film 46 is transported to the transfer section B2 including a platen roller 31 and heat roller 33 by the film transport roller 49.

In the transfer section B2, the transfer film 46 is nipped together with the card Ca by the heat roller 33 and platen roller 31, and the image on the transfer film 46 is transferred to the card surface. In addition, the heat roller 33 is attached to an up-and-down mechanism (not shown) so as to come into contact with and separate from the platen roller 31 via the transfer film 46.

Figure 3:
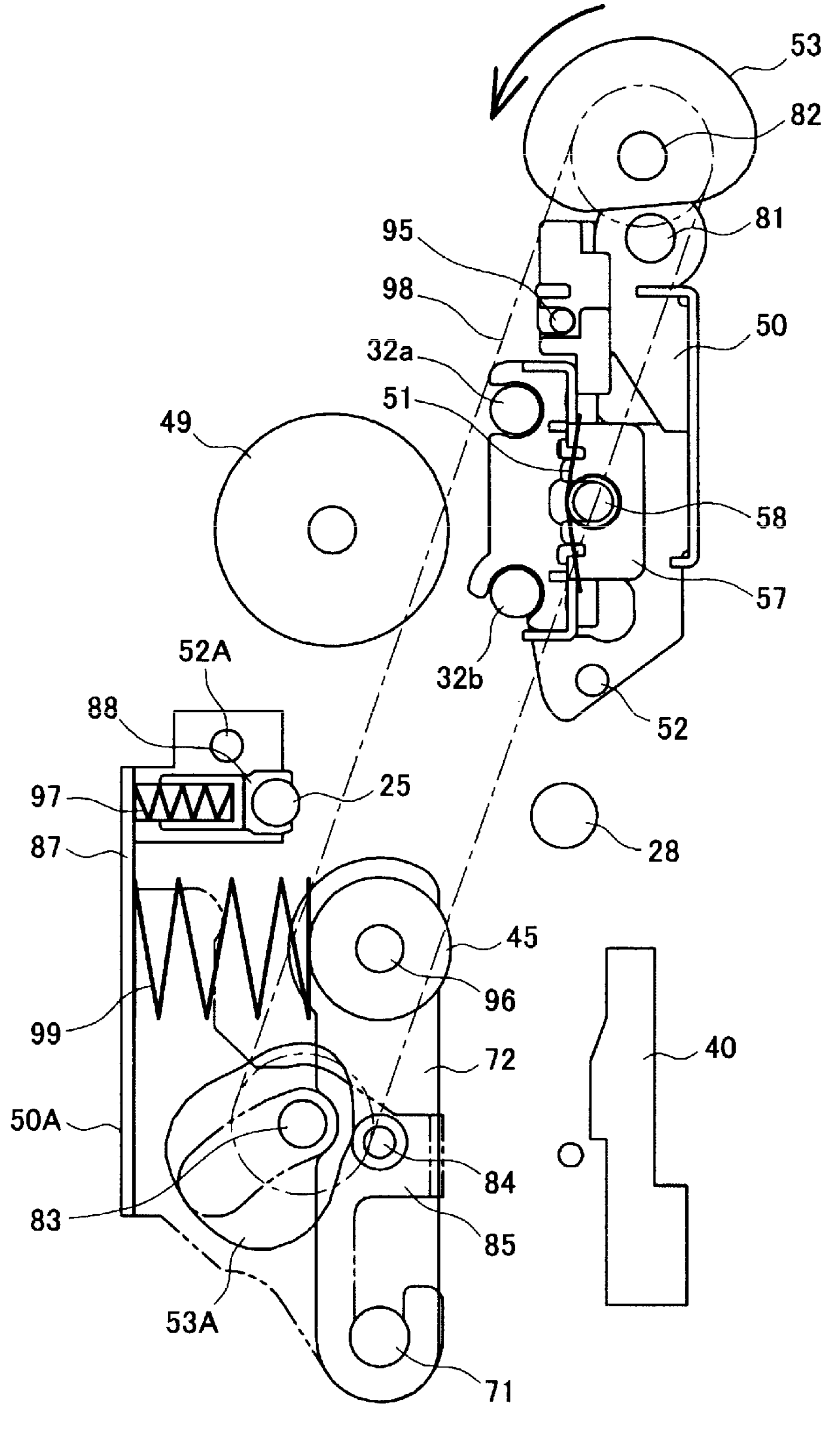
FIG. 3 is an explanatory view of a control state by a cam in a waiting position in which pinch rollers and film transport roller are separated from each other, and a platen roller and thermal head are separated from each other.
Figure 4:
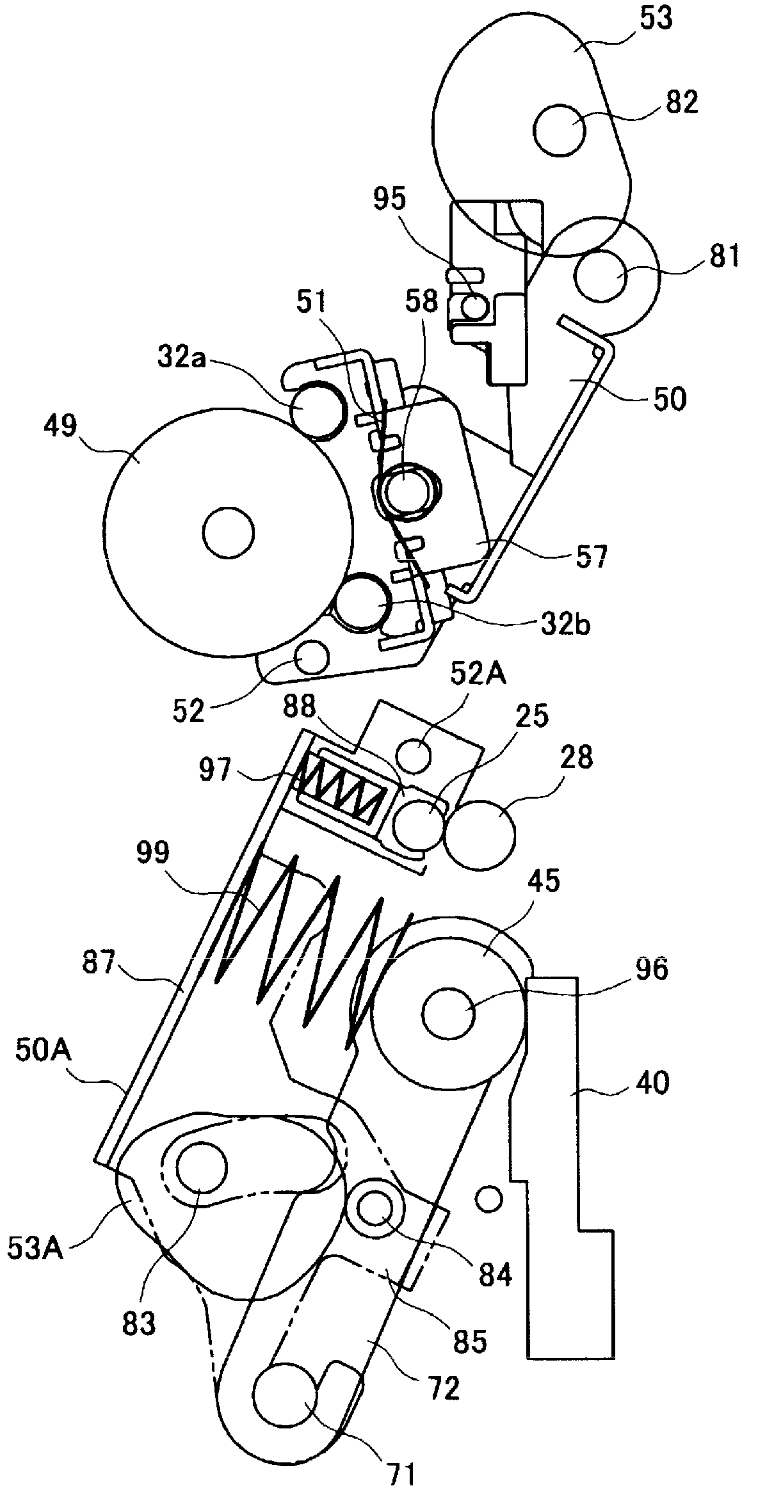
FIG. 4 is an explanatory view of a control state by the cam in a printing position in which the pinch rollers and film transport roller are brought into contact with each other, and the platen roller and thermal head are brought into contact with each other.
Figure 5:
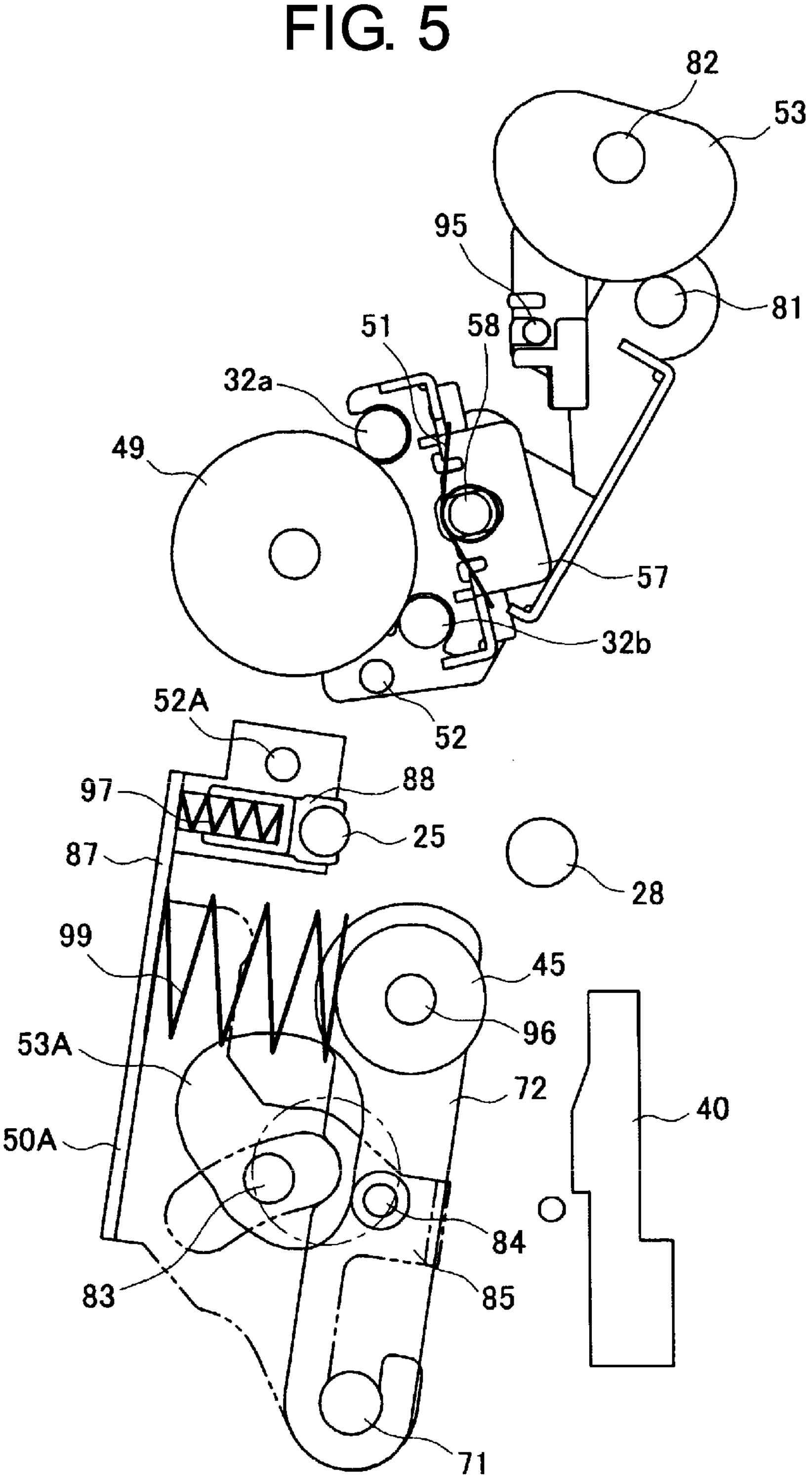
FIG. 5 is an explanatory view of a control state by the cam in a transport position in which the pinch rollers and film transport roller are brought into contact with each other, and the platen roller and thermal head are brought into contact with each other.
Figure 10:
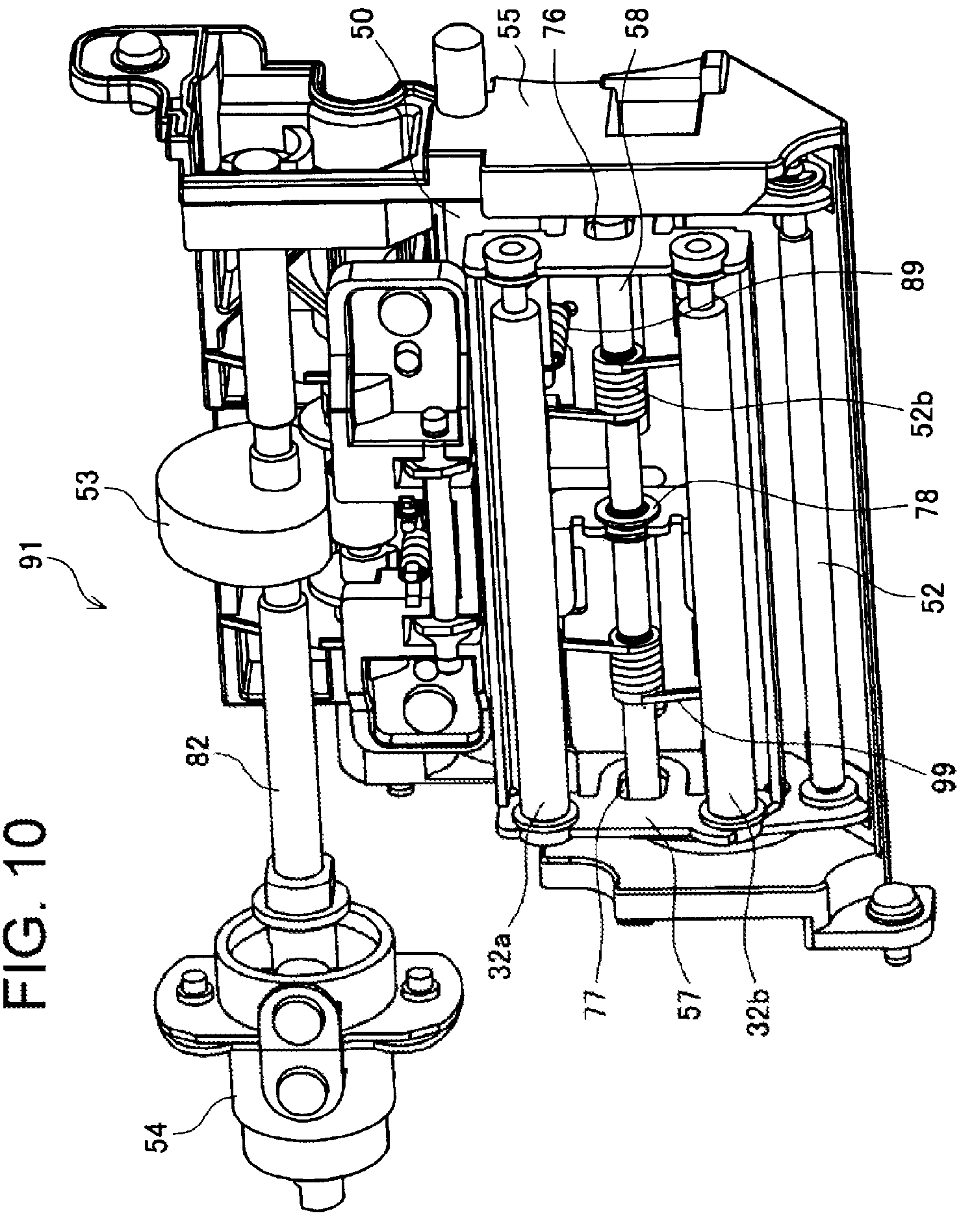
FIG. 10 is an outside view showing a configuration of a second unit integrated to incorporate the pinch rollers and their peripheral parts into the printing apparatus.

The configuration of the printing section B1 will specifically be described further together with its action. As shown in FIGS. 3 to 5, the pinch rollers 32*a*, 32*b* are respectively supported by an upper end portion and lower end portion of a pinch roller support member 57, and the pinch roller support member 57 is supported rotatably by a support shaft 58 penetrating the center portion of the member 57. As shown in FIG. 10, the support shaft 58 is laid at its opposite end portions between long holes 76, 77 provided in the pinch roller support member 57, and is at its center portion fixed to a fix portion 78 of a bracket 50. Further, the long holes 76, 77 are provided with spaces in the horizontal direction and vertical direction with respect to the support shaft 58. Accordingly, it is made possible to adjust the pinch rollers 32*a*, 32*b* with respect to the film transport roller 49, described later.

Then, spring members 51 (51*a*, 51*b*) are mounted on the support shaft 58, and end portions on which the pinch rollers 32*a*, 32*b* are installed of the pinch roller support member 57 respectively contact the spring members 51, and are biased to the direction of the film transport roller 49 by the spring forces.

The bracket 50 comes into contact with the cam operation surface of a cam 53 in a cam receiver 81, and is configured to shift in the horizontal direction viewed in the figure with respect to the film transport roller 49, corresponding to rotation in the arrow direction of the cam 53 with a cam shaft 82 as the axis driven by a drive motor 54 (see FIG. 10). Accordingly, when the bracket 50 moves toward the film transport roller 49 (FIGS. 4 and 5), the pinch rollers 32*a*, 32*b* come into press-contact with the film transport roller 49 against the spring members 51 with the transfer film 46 nipped, and wind the transfer film 46 around the film transport roller 49.

At this point, the pinch roller 32*b* in a farther position from a shaft 95 as a rotation axis of the bracket 50 first comes into press-contact with the film transport roller 49, and next, the pinch roller 32*a* comes into press-contact. In this way, by arranging the shaft 95 that is the rotation axis higher than the film transport roller 49, the pinch roller support member 57 comes into contact with the film transport roller 49 while rotating, instead of parallel shift, and there is the advantage that the space in the width direction is less than in the parallel shift.

Further, the press-contact forces when the pinch rollers 32*a*, 32*b* come into press-contact with the film transport roller 49 are uniform in the width direction of the transfer film 46 by the spring members 51. At this point, since the long holes 76, 77 are provided on the opposite sides of the pinch roller support member 57 and the support shaft 58 is fixed to the fix portion 78, it is possible to adjust the pinch roller support member 57 in three directions, and the transfer film 46 is transported in a correct posture by rotation of the film transport roller 49 without causing skew. In addition, adjustments in three directions described herein are to (i) adjust the parallel degree in the horizontal direction of the shafts of the pinch rollers 32*a*, 32*b* with respect to the shaft of the film transport roller 49 to uniform the press-contact forces in the shaft direction of the pinch rollers 32*a*, 32*b* with respect to the film transport roller 49, (ii) adjust shift distances of the pinch rollers 32*a*, 32*b* with respect to the film transport roller 49 to uniform the press-contact force of the pinch roller 32*a* on the film transport roller 49 and the press-contact force of the pinch roller 32*b* on the film transport roller 49, and (iii) adjust the parallel degree in the vertical direction of the shafts of the pinch rollers 32*a*, 32*b* with respect to the shaft of the film transport roller 49 so that the shafts of the pinch rollers 32*a*, 32*b* are perpendicular to the film travel direction.

Then, the bracket 50 is provided with a tension receiving member 52 that comes into contact with a portion of the transfer film 46 which is not wound around the film transport roller 49 when the bracket 50 moves toward the film transport roller 49.

The tension receiving member 52 is provided to prevent the pinch rollers 32*a*, 32*b* from retracting from the film transport roller 49 respectively against the biasing forces of the spring members 51 due to the tension of the transfer film 46 occurring when the pinch rollers 32*a*, 32*b* bring the transfer film 46 into press-contact with the film transport roller 49. Accordingly, the tension receiving member 52 is attached to the front end of the end portion on the rotation side of the bracket 50 so as to come into contact with the transfer film 46 in the position to the left of the pinch rollers 32*a*, 32*b* viewed in the figure. FIG. 2 shows a state in which the tension receiving member 52 is brought into contact with the transfer film 46.

By this means, the cam 53 is capable of directly receiving the tension occurring due to elasticity of the transfer film 46 through the tension receiving member 52. Accordingly, the pinch rollers 32*a*, 32*b* are prevented from retracting from the film transport roller 49 due to the tension and from decreasing the press-contact forces of the pinch rollers 32*a*, 32*b*, thereby maintain the winding state in which the transfer film 46 is brought into intimate contact with the film transport roller 49, and are able to perform accurate transport.

Figure 9:
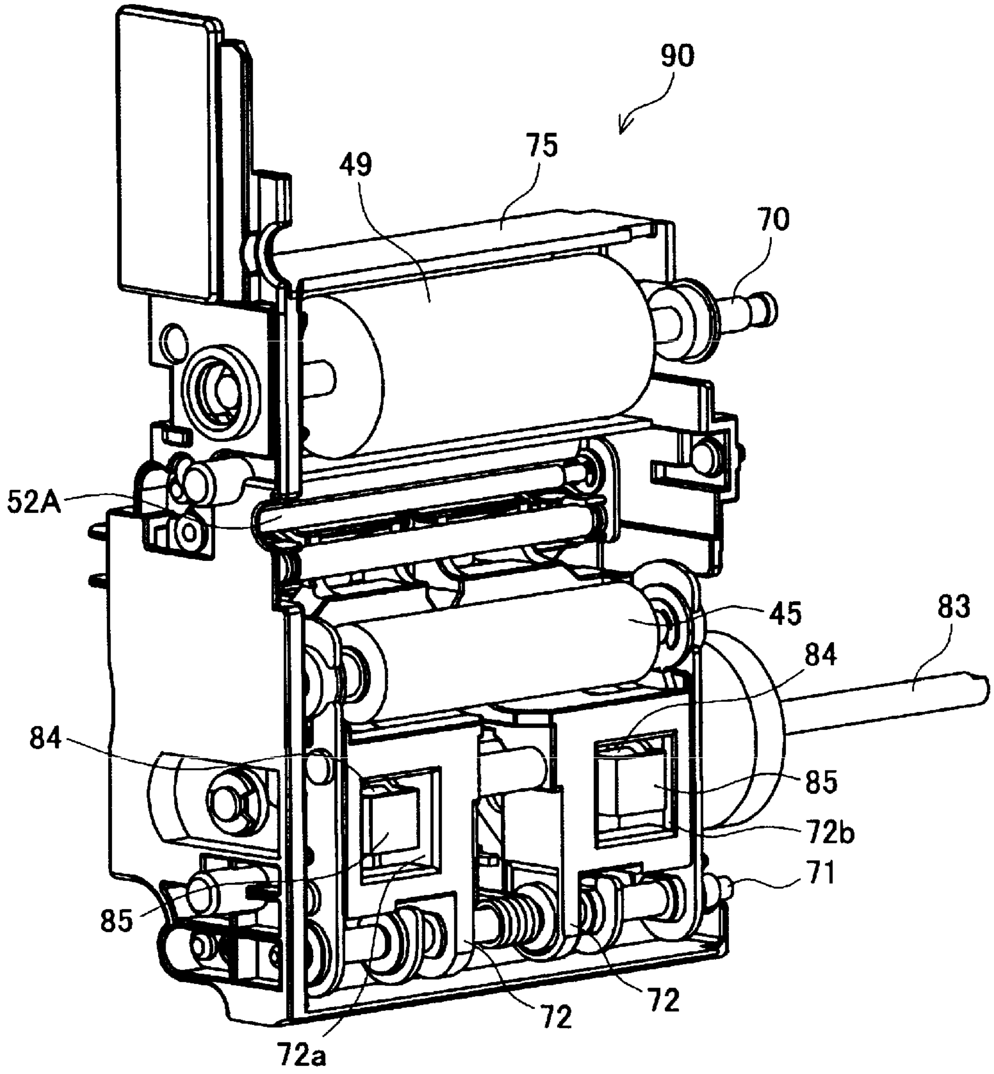
FIG. 9 is an outside view showing a configuration of a first unit integrated to incorporate the film transport roller, platen roller and their peripheral parts into the printing apparatus.

As shown in FIG. 9, the platen roller 45 disposed along the transverse width direction of the transfer film 46 is supported by a pair of platen support members 72 rotatable on a shaft 71 as the axis. The pair of platen support members 72 support opposite ends of the platen roller 45. The platen support members 72 are respectively connected to end portions of a bracket 50A having the shaft 71 as a common rotating shaft via spring members 99.

The bracket 50A is comprised of a substrate 87, and cam receiver support portion 85 formed by bending the substrate 87 in the direction of the platen support member 72, and the cam receiver support portion 85 holds a cam receiver 84. Then, a cam 53A rotating on a cam shaft 83 as the axis driven by the drive motor 54 is disposed between the substrate 87 and the cam receiver support portion 85, and is configured so that the cam operation surface and cam receiver 84 come into contact with each other. Accordingly, when the bracket 50A moves in the direction of the thermal head 40 by rotation of the cam 53A, the platen support members 72 also shift to bring the platen roller 45 into press-contact with the thermal head 40.

The spring members 99 and cam 53A are thus disposed vertically between the bracket 50A and platen support members 72, and it is thereby possible to store the platen shift unit within the distance between the bracket 50A and platen support members 72. Further, the width direction is held within the width of the platen roller 45, and it is possible to save space.

Moreover, since the cam receiver support portion 85 is fitted into bore portions 72*a*, 72*b* (see FIG. 9) formed in the platen support members 72, even when the cam receiver support portion 85 is formed while protruding in the direction of the platen support members 72, the distance between the bracket 50A and the platen support members 72 is not increased, and also in this respect, it is possible to save space.

When the platen roller 45 comes into press-contact with the thermal head 40, the spring members 99 connected to respective platen support members 72 act each so as to uniform the press-contact force on the width direction of the transfer film 46. Accordingly, when the transfer film 46 is transported by the film transport roller 49, the skew is prevented, and it is possible to perform thermal transfer by the thermal head 40 accurately without the printing region of the transfer film 46 shifting in the width direction.

The substrate 87 of the bracket 50A is provided with a pair of peeling roller support members 88 for supporting opposite ends of the peeling roller 25 via spring members 97, and when the bracket 50A moves to the thermal head 40 by rotation of the cam 53A, the peeling roller 25 comes into contact with the peeling member 28 to peel off the transfer film 46 and ink ribbon 41 nipped between the roller and member. The peeling roller support members 88 are also provided respectively at opposite ends of the peeling roller 25 as in the platen support members 72, and are configured so as to uniform the press-contact force in the width direction on the peeling member 28.

A tension receiving member 52A is provided in an end portion on the side opposite to the end portion on the shaft support 59 side of the bracket 50A. The tension receiving member 52A is provided to absorb the tension of the transfer film 46 occurring in bringing the platen roller 45 and peeling roller 25 respectively into press-contact with the thermal head 40 and peeling member 28. The spring members 99 and 97 are provided so as to uniform the press-contact force on the width direction of the transfer film 46, and in order for the spring members 99 and 97 not to be inversely behind the tension of the transfer film 46 and decrease the press-contact force on the transfer film 46, the tension receiving member 52A receives the tension from the transfer film 46. In addition, since the tension receiving member 52A is also fixed to the bracket 50A as in the above-mentioned tension receiving member 52, the cam 53A receives the tension of the transfer film 46 via the bracket 50A, and is not behind the tension of the transfer film 46. By this means, the press-contact force of the thermal head 40 and platen roller 45 and the press-contact force of the peeling member 28 and peeling roller 25 are held, and it is thereby possible to perform excellent printing and peeling. Further, any error does not occur in the transport amount of the transfer film 46 in driving the film transport roller 49, the transfer film 46 corresponding to the length of the printing region is accurately transported to the thermal head 40, and it is possible to perform printing with accuracy.

The cam 53 and cam 53A are driven by same drive motor 54 with a belt 98 (see FIG. 3) laid there between.

Figure 6:
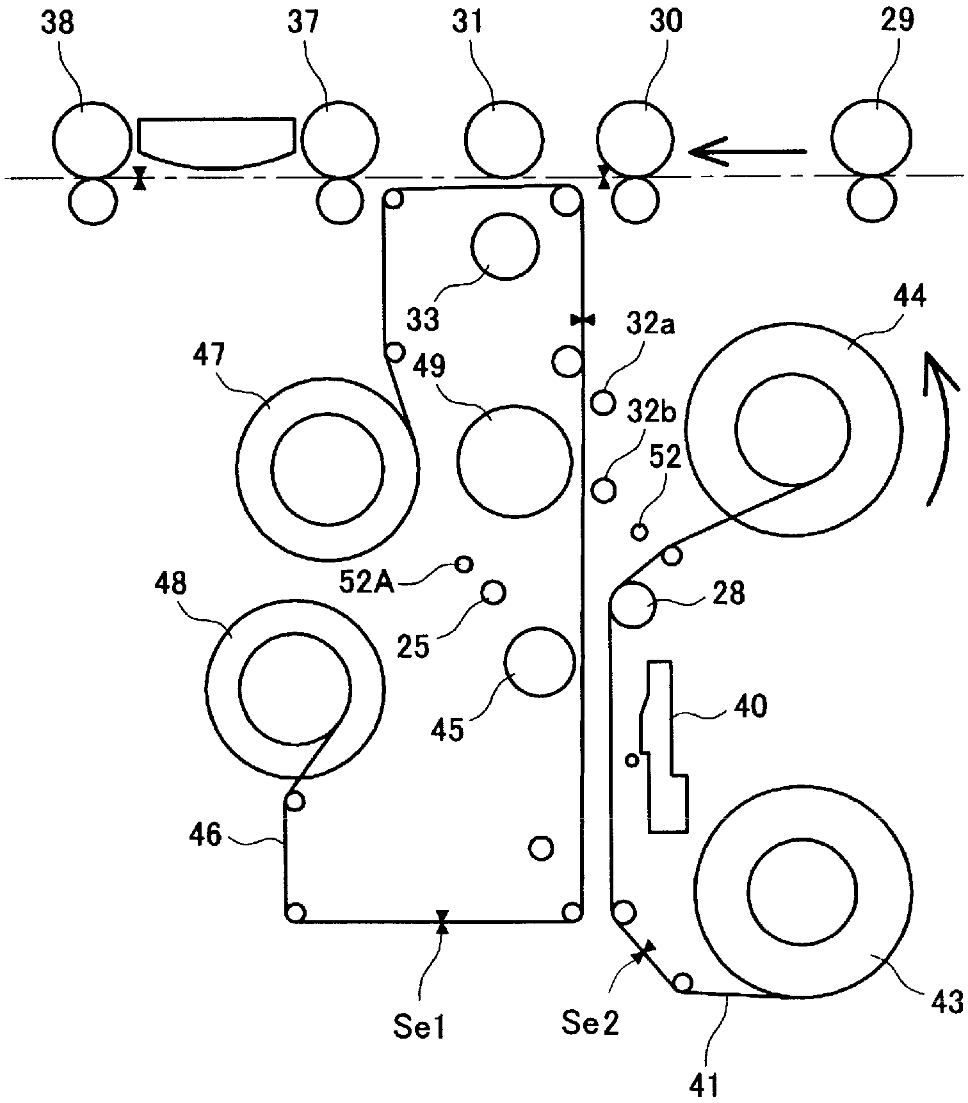
FIG. 6 is an operation explanatory view to explain the state of the waiting position in the printing apparatus.

When the image formation section B is in such a waiting position as shown in FIG. 6, the cam 53 and cam 53A are in the state as shown in FIG. 3, the pinch rollers 32*a*, 32*b* are not brought into press-contact with the film transport roller 49, and the platen roller 45 is not brought into press-contact with the thermal head 40 either. In other words, in the waiting position, the platen roller 45 and thermal head 40 are positioned in separate positions in which the roller 45 and head 40 are separate.

Figure 7:
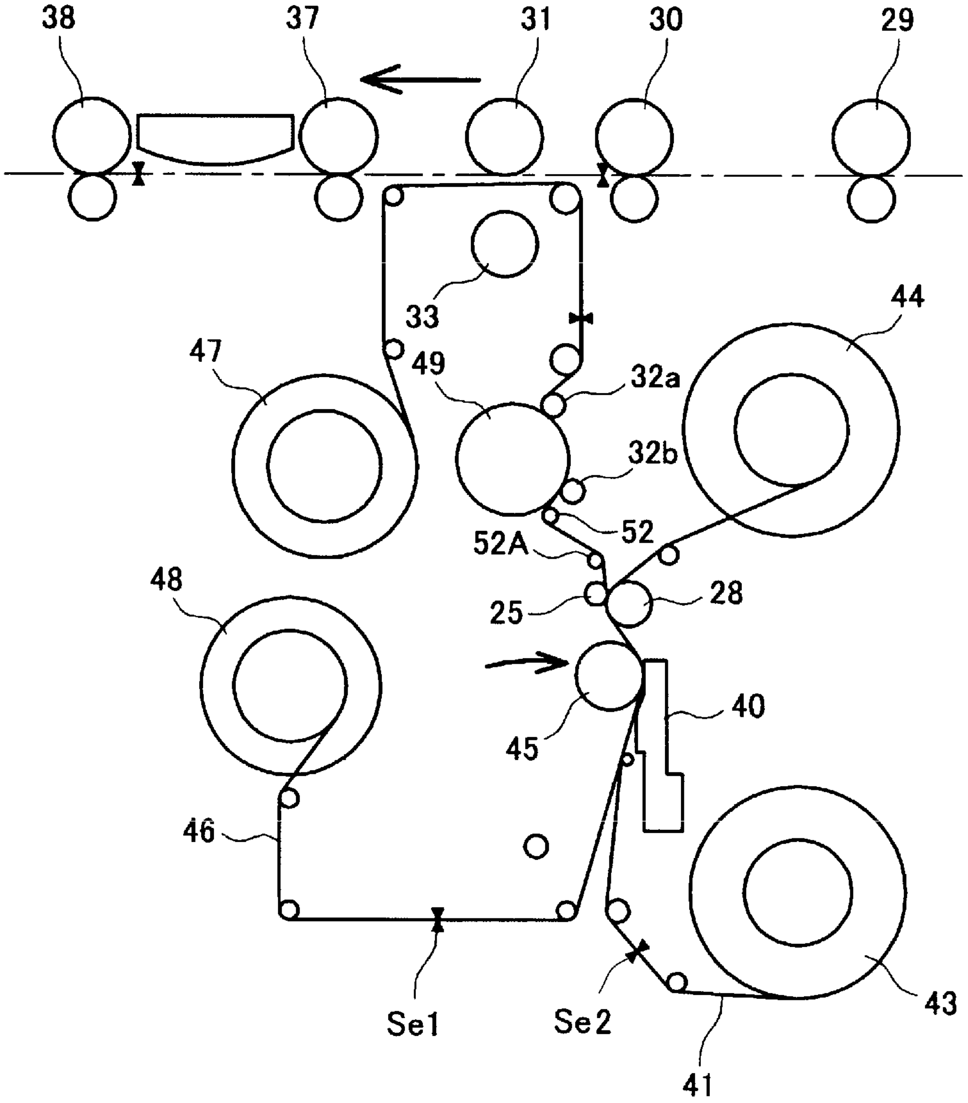
FIG. 7 is an operation explanatory view to explain the state of the transport position in the printing apparatus.

Then, when the cam 53 and cam 53A are rotated in conjunction with each other and are in the state as shown in FIG. 4, the image formation section B shifts to a printing position as shown in FIG. 7. At this point, the pinch rollers 32*a*, 32*b* first wind the transfer film 46 around the film transport roller 49, and concurrently, the tension receiving member 52 comes into contact with the transfer film 46. Subsequently, the platen roller 45 comes into press-contact with the thermal head 40. In this printing position, the platen roller 45 shifts toward the thermal head 40 to nip the transfer film 46 and ink ribbon 41 and come into press-contact, and the peeling roller 25 is in contact with the peeling member 28.

In this state, when transport of the transfer film 46 is started by rotation of the film transport roller 49, at the same time, the ink ribbon 41 is also wound around the wind-up spool 44 by operation of the motor Mr1 and transported in the same direction. During this transport, a positioning mark provided in the transfer film 46 passes through a sensor Se1 and shifts a predetermined amount, and at the time the transfer film 46 arrives at a printing start position, printing by the thermal head 40 is performed on the predetermined region of the transfer film 46. Particularly, since the tension of the transfer film 46 is large during printing, the tension of the transfer film 46 acts on the direction for separating the pinch rollers 32*a*, 32*b* from the film transport roller 49 and the direction for separating the peeling roller 25 and platen roller 45 from the peeling member 28 and thermal head 40. However, as described above, since the tension of the transfer film 46 is received in the tension receiving members 52, 52A, the press-contact forces of the pinch rollers 32*a*, 32*b* are not decreased, it is thereby possible to perform accurate film transport, the press-contact force of the thermal head 40 and platen roller 45 and the press-contract force of the peeling member 28 and peeling roller 25 are not decreased either, and it is possible to perform accurate printing and peeling. The ink ribbon 41 with which printing is finished is peeled off from the transfer film 46 and wound around the wind-up spool 44.

A shift amount by transport of the transfer film 46 i.e. a length in the transport direction of a printing region to undergo printing is detected by an encoder (not shown) provided in the film transport roller 49, rotation of the film transport roller 49 is halted corresponding to detection, and at the same time, winding by the wind-up spool 44 by operation of the motor Mr1 is also halted. By this means, finished is printing of the first color on the printing region of the transfer film 46 with the thermal head 40.

Figure 8:
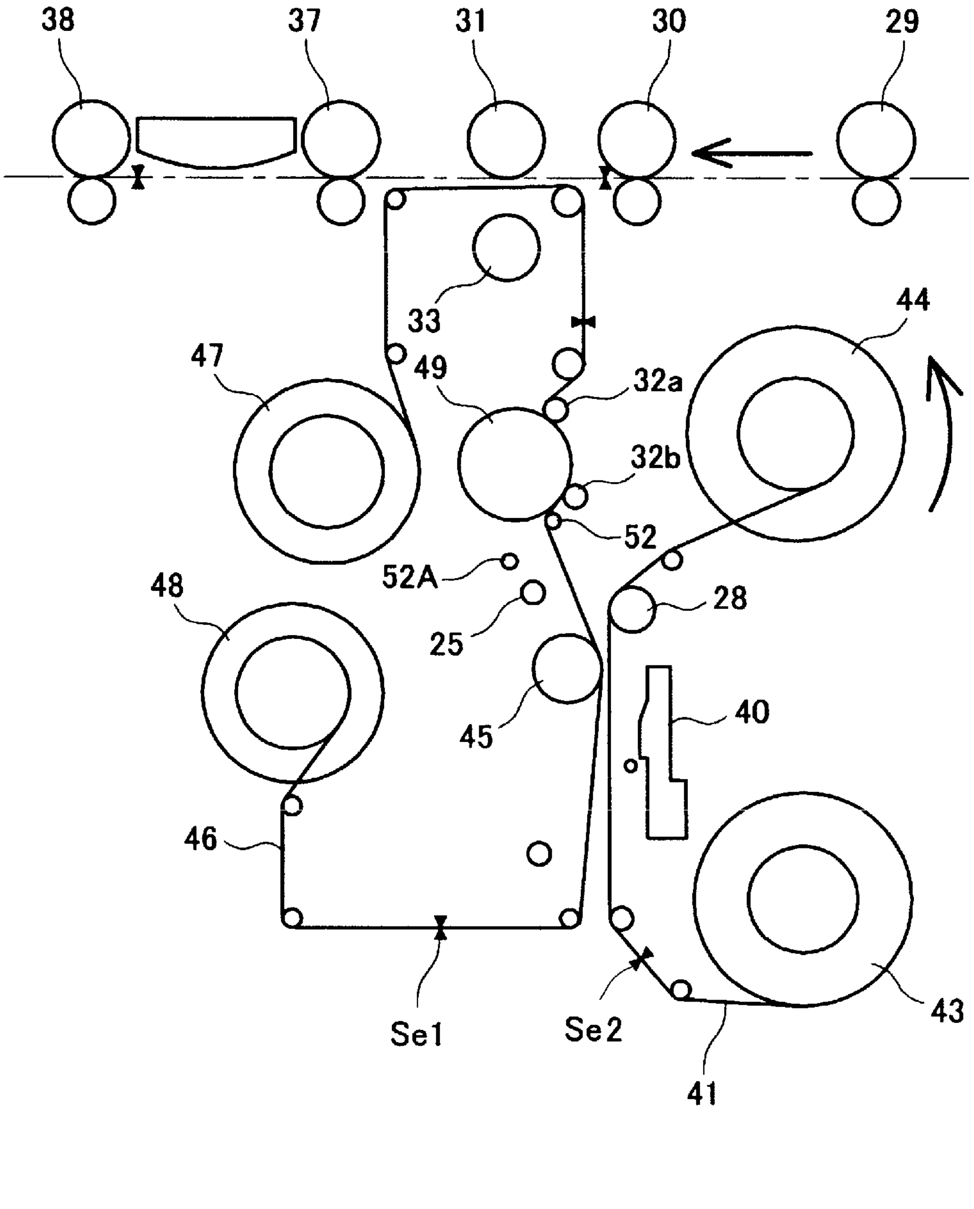
FIG. 8 is an operation explanatory view to explain the state of the printing position in the printing apparatus.

Then, when the cam 53 and cam 53A are further rotated in conjunction with each other and are in the state as shown in FIG. 5, the image formation section B shifts to a transport position as shown in FIG. 8, and the platen roller 45 returns to the direction of retracting from the thermal head 40. In this state, the pinch rollers 32*a*, 32*b* still wind the transfer film 46 around the film transport roller 49, the tension receiving member 52 is in contact with the transfer film 46, and the transfer film 46 is transported backward to an initial position by rotation in the backward direction of the film transport roller 49. Also at this point, the shift amount of the transfer film 46 is controlled by rotation of the film transport roller 49, and the transfer film 46 is transported backward corresponding to the length in the transport direction of a printing region subjected to printing. In addition, the ink ribbon 41 is rewound a predetermined amount with the motor Mr3, and the panel of the color to print next waits in the initial position (feeding position).

Then, the control state by the cam 53 and cam 53A becomes the state as shown in FIG. 4 again and the printing position as shown in FIG. 7, the platen roller 45 is brought into press-contact with the thermal head 40, the film transport roller 49 rotates in the forward direction again to shift the transfer film 46 corresponding to the length of a printing region, and printing with the next color is performed with the thermal head 40.

Thus, the operation in the printing position and transport position is repeated until printing of all colors (in this Embodiment, four colors of Y (Yellow), M (Magenta), C (Cyan) and Bk (Black)) is finished, and further, is repeated in peeling off the transfer layer of a predetermined region of the transfer film 46 with the peel off panel (PO). Then, when printing (image formation on the transfer film 46 and peeling of the transfer layer in the predetermined region) with the thermal head 40 is finished, the image-formed region of the transfer film 46 is transported to the heat roller 33, and at this point, the cam 53 and cam 53A shift to the state as shown in FIG. 3, and release press-contact with the transfer film 46. Subsequently, transfer to the card Ca is performed while transporting the transfer film 46 by driving of the wind-up spool 47.

Such an image formation section B is divided into three units 90, 91, 92 and each is integrated.

In the first unit 90 as shown in FIG. 9, a unit frame body 75 is installed with a drive shaft 70 that rotates by driving of the motor 54 (see FIG. 10), and the driving shaft 70 is inserted in the film transport roller 49. Below the film transfer film 49 are disposed the bracket 50A and a pair of platen support members 72, and these members are supported rotatably by the shaft 71 laid between opposite side plates of the unit frame body 75.

In FIG. 9, a pair of cam receiver support portions 85 that are a part of the bracket 50A appear from the bore portions 72*a*, 72*b* formed in the platen support members 72. The cam receiver support portions 85 hold a pair of cam receivers 84 disposed at the back thereof. Then, at the back of the cam receivers 84 is disposed the cam 53A installed in the cam shaft 83 inserted in the unit frame body 75. The cam shaft 83 is laid between opposite side plates of the unit frame body 75.

Figure 11:
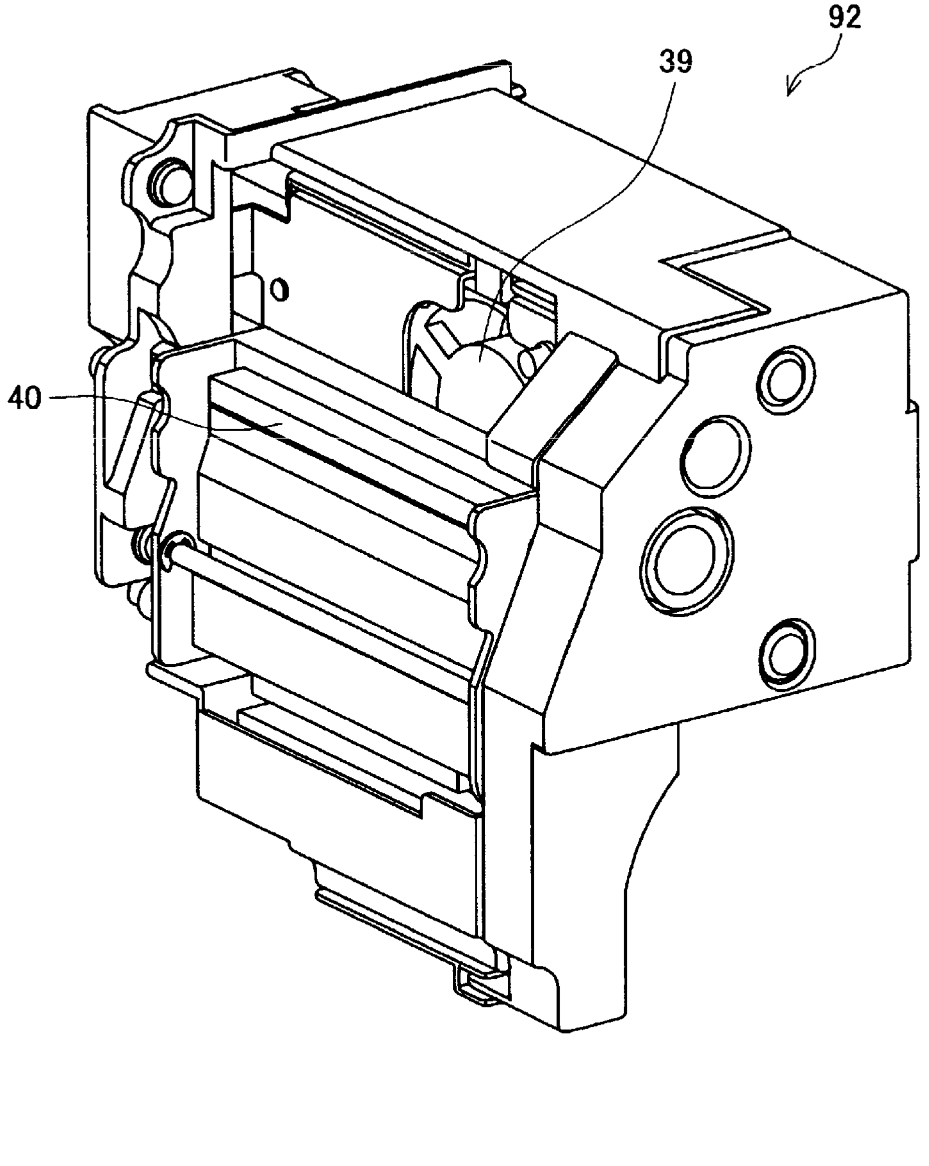
FIG. 11 is an outside view of a third unit integrated to incorporate the thermal head into the printing apparatus.

The thermal head 40 is disposed in the position opposed to the platen roller 45 with a transport path of the transfer film 46 and ink ribbon 41 there between. The thermal head 40, members related to heating and cooling fan 39 are integrated into the third unit 92 as shown in FIG. 11, and are disposed opposite the first unit 90.

The first unit 90 collectively holds the platen roller 45, peeling roller 25 and tension receiving member 52A varying in position by printing operation in the movable bracket 50A, and thereby eliminates the need of position adjustments among the members. Moreover, by shifting the bracket 50A by rotation of the cam 53, it is possible to shift the members to predetermined positions. Further, since the bracket 50A is provided, it is possible to store in the same unit as that of the fixed film transport roller 49, the transport drive portion by the film transport roller 46 required to transport the transfer film with accuracy and the transfer position regulation portion by the platen roller 45 are included in the same unit, and therefore, the need is eliminated for position adjustments between both portions.

In the second unit 91 as shown in FIG. 10, the cam shaft 82 installed with the cam 53 is inserted in a unit frame body 55, and is coupled to an output shaft of the drive motor 54. Then, the second unit 91 supports the bracket 50 in the unit frame body 55 movably to come into contact with the cam 53, and to the bracket 50 are fixed the support shaft 58 that supports the pinch roller support member 57 rotatably and the tension receiving member 52.

In the pinch roller support member 57, the spring members 51*a*, 51*b* are attached to the support shaft 58, and their end portions are respectively brought into contact with the opposite ends of the pinch roller support member 57 that supports the pinch rollers 32*a*, 32*b* to bias to the direction of the film transport roller 49. Then, in the pinch roller support member 57, the support shaft 58 is inserted in the long holes 76, 77, and is fixed and supported in the center portion by the bracket 50.

A spring 89 for biasing the pinch roller support member 57 toward the bracket 50 is provided between the bracket 50 and the pinch roller support member 57. By this spring 89, the pinch roller support member 57 is biased in the direction of moving backward from the film transport roller 49 of the first unit 90, and therefore, it is possible to easily pass the transfer film 46 through between the first unit 90 and the second unit 91 in setting the transfer film cassette in the printing apparatus 1.

The second unit 91 holds the pinch rollers 32*a*, 32*b*, and tension receiving member 52 varying in position corresponding to printing operation in the bracket 50A, shifts the pinch rollers 32*a*, 32*b*, and tension receiving member 52 by shifting the bracket 50A by rotation of the cam 53, and thereby simplifies position adjustments between the rollers and member, and position adjustments between the pinch rollers 32*a*, 32*b* and the film transport roller 49. Such a second unit 91 is disposed opposite the first unit 90 with the transfer film 46 there between.

By thus making the units, it is also possible to pull each of the first unit 90, second unit 92 and third unit 93 out of the main body of the printing apparatus 1 as in the cassette of each of the transfer film 46 and ink ribbon 41. Accordingly, in replacing the cassette due to consumption of the transfer film 46 or ink ribbon 41, when the units 90, 91 and 92 are pulled out as required, it is possible to install the transfer film 46 or ink ribbon 41 readily inside the apparatus in inserting the cassette.

As described above, by combining the first unit 90 into which are integrated the platen roller 45, bracket 50A, cam 53A, and platen support member 72, and the second unit 91 into which are integrated the pinch rollers 32*a*, 32*b*, bracket 50, cam 53 and spring members 51, and placing and installing the third unit 92 with the thermal head 40 attached thereto opposite the platen roller 45, it is possible to perform assembly in manufacturing the printing apparatus and adjustments in maintenance with ease and accuracy. Moreover, by integrating, it is possible to perform removal from the apparatus with ease, and the handleability as the printing apparatus is improved.

<Ink Ribbon Cassette>

Figure 12:
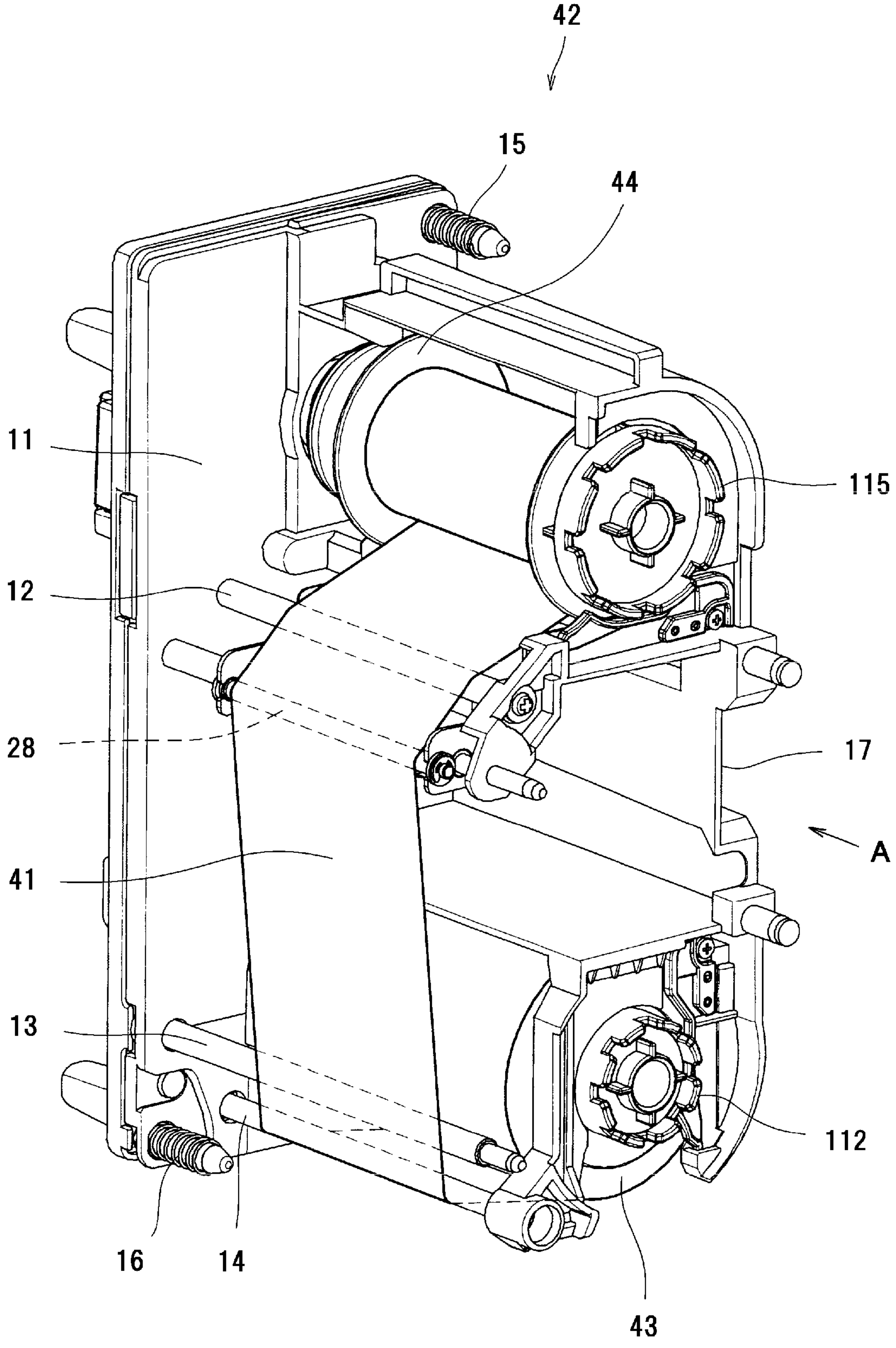
FIG. 12 is an outside perspective view of a ribbon cassette.

The cassette 42 storing the ink ribbon 41 will specifically be described next. As shown in FIG. 12, the cassette 42 has a base 11 in the shape of a rectangular plate that is a base bench of the cassette 42. Main-body connection protrusions 15, 16 to insert in the printing apparatus 1 protrude in the base 11. Springs are wound around the main-body insertion protrusions 15, 16, and by the springs, the cassette is slidably inserted in the printing apparatus 1.

The wind-up spool 44 is disposed rotatably on one side (upper side in FIG. 12) in the longitudinal direction of the base 11, and the supply spool 43 is disposed rotatably on the other side (lower side in FIG. 12) in the longitudinal direction of the base 11. In other words, on one side and the other side of the base 11 are formed circular through holes for axially supporting shafts (see reference numeral "119" in FIG. 13) on one side of the wind-up spool 44 and supply spool 43 rotatably, respectively. The wind-up spool 44 has an engagement portion 115 with a large diameter on the other side of the shaft, and the supply spool 43 has an engagement portion 112 with a diameter smaller than that of the engagement portion 115 on the other side of the shaft 119. The reason why the diameters are thus different between the engagement portion 115 and the engagement portion 112 is to prevent erroneous insertion in the vertical direction shown in FIG. 12 in inserting the cassette 42 in the main-body apparatus.

Further, the cassette 42 has a cover 17 that covers the wind-up spool 44 and the supply spool 43 in the direction crossing the base 11. The cover 17 is fixed to the end portion along the longitudinal direction of the base 11. Further, from the lower side to upper side in FIG. 12, in the cassette 42 are disposed shafts 14, 13, shaft-shaped peeling member 28, and shaft 12 to be parallel with the shaft line of the supply spool 43 or wind-up spool 44. These shafts are fixed on one side to the base 11, while being fixed on the other side to extension portions extending to be opposed to the base 11 from the cover 17.

Accordingly, the ink ribbon 41 fed out of the supply spool 43 is transported to come into slide-contact on one surface side with the shafts 14, 13, peeling member 28 and shaft 12 to be wound around the wind-up spool 44, or inversely, to come into slide-contact with the shaft 12, peeling member 28 and shafts 14, 13 to be wound around the supply spool 43.

Described herein is the arrangement relationship between the sensor Se2 and thermal head 40 on the main-body side and the shafts when the cassette 42 is inserted in the main-body apparatus. As shown in FIG. 6, the sensor Se2 is positioned in between the shaft 14 and the shaft 13 along the ink ribbon 41 fed out of the supply spool 43, and the thermal head 40 is positioned in between the shaft 13 and the peeling member 28.

Described further is the relationship among the ink ribbon 41, supply spool 43, wind-up spool 44 and the like when the cassette 42 is inserted in the main-body apparatus. The length of the ink ribbon 41 laid between the supply spool 43 and the wind-up spool 44 is set to be shorter than the total length of three ribbon panels among ribbon panels of successive four colors of Y (Yellow), M (Magenta), C (Cyan) and Bk (Black), and further, along the ink ribbon 41 laid between the supply spool 43 and the wind-up spool 44, each of the distance between the supply spool 43 and the sensor Se2, the distance between the sensor Se2 and the thermal head 40, the distance between the thermal head 40 and the peeling member 28, and the distance between the peeling member 28 and the wind-up spool 44 is set to be shorter than the length of a ribbon panel of one color of the ink ribbon 41.

Figure 13:
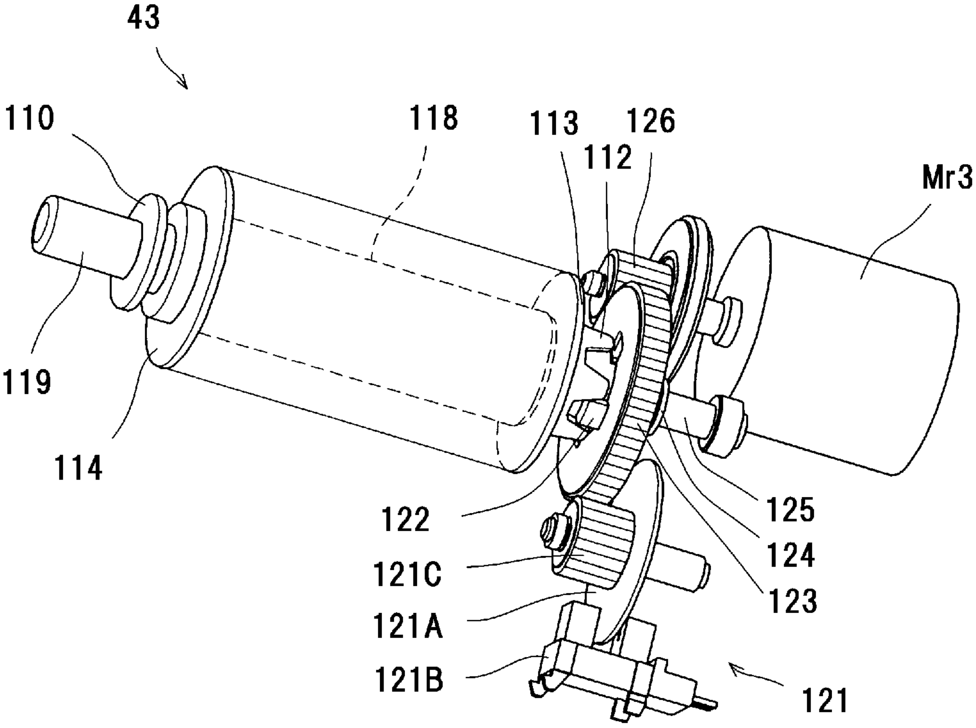
FIG. 13 is a perspective view showing an engagement state of a supply spool and the main body side.

With reference to FIG. 13, described next are a spool main body 110 on the supply spool 43 side and an engagement portion of the printing apparatus 1 to engage in the spool main body 110. FIG. 13 shows an engagement state of the engagement portion 112 of the supply spool 43 and an engagement member (engagement convex portion 122) on the main-body apparatus side. An engagement state of the engagement portion of the wind-up spool 44 and an engagement member on the main-body apparatus is the same, the supply spool 43 is therefore only described, and the description on the wind-up spool 44 is omitted. The engagement portion 112 has eight rectangular convex portions protruding in the direction of the end portion. In addition, in the supply spool 43 and wind-up spool 44 shown in FIG. 12, the ink ribbon 41 is wound around (held by) the respective spool main body 110, an unused portion of the ink ribbon 41 is wound around the supply spool 43, and a used portion of the ink ribbon 41 (ink ribbon 41 subjected to thermal transfer with the thermal head 40) is wound around the wind-up spool 44.

The spool main body 110 has a cylindrical ribbon holding portion 118 having fringes 113, 114 at opposite ends to hold the ink ribbon 41, the engagement portion 112 provided on one end portion adjacent to the fringe 113, and a shaft portion 119 with a diameter smaller than that of the cylindrical portion of the ribbon holding portion 118 provided on the side opposite to the engagement portion 112 adjacent to the fringe 114.

The fringes 113, 114 regulate the position of winding of the ink ribbon 41 around the ribbon holding portion 118 in the shaft direction of the spool main body 110. Therefore, when the spool main body 110 rotates, an unused ink ribbon 41 is supplied from the ribbon holding portion 118 without causing misregistration (in the case of the supply spool 43), and a used portion of the ink ribbon 41 is properly wound around the ribbon holding portion on the wind-up side (in the case of the wind-up spool 44).

The engagement portion on the main-body apparatus side associated with the engagement portion 112 of the supply spool 43 is comprised of a plurality of members. In other words, a support shaft 125 is fixed to the housing 2, and axially supports the disk-shaped engagement member having a gear on the outer edge portion to be rotatable. On the side engaging in the engagement portion 112 of the engagement member, two engagement convex portions 122 of shapes different from the convex portion (groove portion) of the engagement portion 112 are provided to protrude opposite each other (so as to make a phase difference of 180° with respect to the rotation direction of the engagement portion). In the engagement portion 122 is formed a groove formed from an inclined surface linearly formed on the convex-portion side surface having a predetermined inclined angle, and a bottom portion connecting between adjacent convex-portion inclined surfaces (in FIG. 13, the relationship between the engagement portion 112 and the convex portion of the engagement portion 122 is inverse.) Further, a spring 124 is wound around the support shaft 125, and by this spring 124, the engagement portion (engagement convex portions 122) is biased to the engagement portion side slidably. A gear 123 meshes with a gear 126 fitted into the motor shaft of the motor Mr3. Therefore, the rotation driving force is transferred from the motor Mr3 to the spool main body 110.

In inserting the cassette 42 in the main-body apparatus, there is the case that the front end of the convex portion of the engagement portion 112 of the spool main body 110 comes into contact with (hits) the front end of the engagement convex portion 122 provided in the engagement member on the apparatus main body side, and is not inserted smoothly. Since the engagement member is provided slidably in the shaft direction of the support shaft 125, when the front ends of the convex portions of the engagement portion 112 hit the front ends of the engagement convex portions 122, the engagement convex portions 122 once retract to the apparatus frame side (on the side opposite to the spool main body 110). Subsequently, when the engagement member or spool main body 110 rotates, the engagement convex portions 122 enter into the groove between convex portions of the engagement portion 112, and are biased to the spool main body 110 side by the spring 124, and the engagement convex portions 122 and the (groove between) convex portions of the engagement portion 112 come into point-contact in two points.

The gear of the engagement member meshes with a gear 121C, and to the gear 121C is fixed a rotating plate 121A with a slit (not shown) formed on the same axis. Further, in a position to sandwich the rotating plate 121A is disposed a transmission integral-type sensor 121B comprised of a light emitting device and a light receiving device. Accordingly, the rotating plate 121A and sensor 121B constitute the encoder 121 as a rotation amount detecting device for detecting a rotation amount of the supply spool 43 that supplies the ink ribbon 41. In addition, an encoder (not shown) provided in the above-mentioned film transport roller 49 is configured in the same way. In other words, a gear that is the same as the gear 123 shown in FIG. 13 is fitted into the above-mentioned drive shaft 70 (see FIG. 9), the encoder has a gear (that corresponds to the gear 121C in FIG. 13) meshing with the gear and a rotating plate (that corresponds to the rotating plate 121A), and it is configured that rotation of the rotating plate is capable of being detected with a sensor (that corresponds to the sensor 121B in FIG. 13).

With the printing processing on the transfer film 46 with the thermal head 40, the ink ribbon 41 is transported from the supply spool 43 side to the wind-up spool 44, and according to transport, the ribbon diameter of the supply spool 43 shifts from the large diameter to the small diameter, while the ribbon diameter of the wind-up spool 43 changes from the small diameter to the large diameter. With the change, the tension in winding the ink ribbon 41 around the wind-up spool 44 shifts from high to low, and inversely, the tension in rewinding the ink ribbon 41 around the supply spool 43 shifts from low to high. Therefore, in this example, used are two motors of the motor Mr1 that is the rotation drive source of the wind-up spool 44 and motor Mr3 that is the rotation drive source of the supply spool 43.

Described next is control and electric system of the printing apparatus 1. As shown in FIG. 14, the printing apparatus 1 has a control section 100 that performs operation control of the entire printing apparatus 1, and a power supply section 120 that transforms utility AC power supply into DC power supply that enables each mechanism section, control section and the like to be driven and actuated.

<Control Section>

As shown in FIG. 14, the control section 100 is provided with a microcomputer 102 that performs entire control processing of the printing apparatus 1. The microcomputer 102 is comprised of a CPU that operates at fast clock as the central processing unit, ROM in which is stored basic control operation (programs and program data) of the printing apparatus 1, RAM that works as a work area of the CPU, and internal buses that connect the components.

The microcomputer 102 is connected to an external bus. The external bus is connected to an interface, not shown, to communicate with the higher apparatus 201, and buffer memory 101 to temporarily store printing data to print on the card Ca, recording data to magnetically or electrically record in a magnetic stripe portion or stored IC of the card Ca, and the like.

Further, the external bus is connected to a sensor control section 103 that controls signals from various sensors, an actuator control section 104 that controls motor drivers and the like for outputting drive pulses and drive power to respective motors, a thermal head control section 105 to control thermal energy to heating elements constituting the thermal head 40, an operation display control section 106 to control the operation panel section 5, and the above-mentioned information recording section A.

The power supply section 120 supplies operation/drive power to the control section 100, thermal head 40, operation panel section 5 and information recording section A.

<Characteristics and Others of the Printing System 200>

Described next are characteristics and others of the printing system 200 of this Embodiment.

(Application Software)

In the higher apparatus 200 is installed object generation application software which functions as "an object generation/non-transfer region setting device" and generates each printing object, while generating a desired image comprised of a plurality of printing objects to print on the card Ca, and a printer driver (application software) which functions as "a converting device" and generates printing data for the printing apparatus 1 based on the data generated in the object generation application software.

(Generation of Printing Object)

Figure 15:
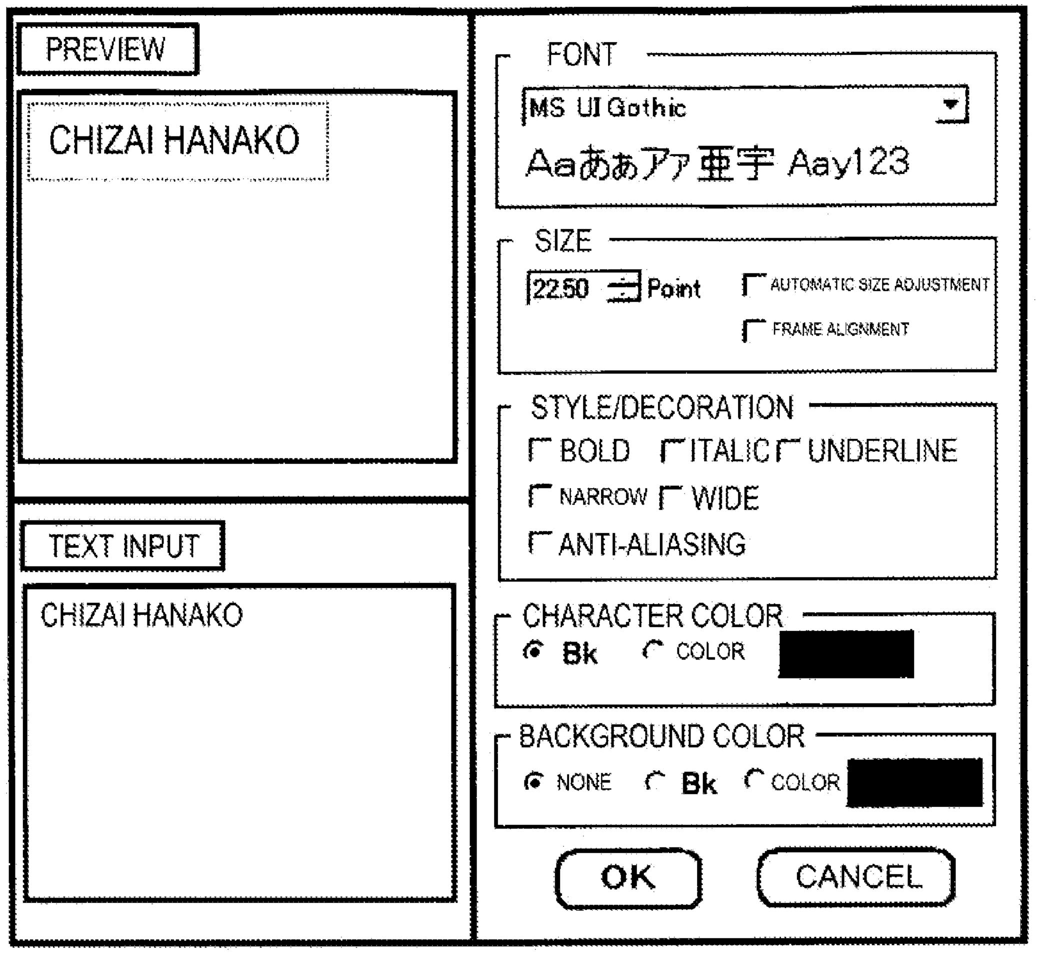
FIG. 15 is an explanatory view schematically showing an example of a screen displayed on a monitor of a higher apparatus in generating an object with object generation application software.

Herein, generation of a printing object will be described using an example. FIG. 15 schematically shows an example of a screen displayed on a monitor 202 in the case of generating a printing object of "Chizai Hanako" that is a full name of the owner printed on the card Ca. In this example, an operator inputs "Chizai Hanako" (text data) from a keyboard of the input apparatus 203 in a field of "Text Input", and further inputs printing information such as a font, font size, style/decoration, character color, and background color with the mouse (not shown) of the input apparatus 203, and in a field of preview is displayed the printing object generated from the input text data and printing information. Referring to the preview, the operator generates a desired printing object (text data) by operating (modifying) the input apparatus 203, and clicks an OK button. By this means, the higher apparatus 201 retrieves a single printing object (including size information of the object), the object generation application software assigns a name and number to specify the printing object, and the printing object is stored in a beforehand determined folder of the higher apparatus 201. In addition, this example shows the printing object in which the printing object displayed in the field of "preview" is comprised of a plurality of characters and the font, font size and the like of the characters are the same, but a printing object may be comprised of a single character, or may be comprised of a plurality of characters each of which is a different font and font size.

Generally, as well as the full name of the owner, since the card Ca includes various printing objects (text data) such as a name of a company to which the owner belongs and the ID number and is comprised thereof, it is possible to generate the other objects (other than the full name) according to the above-mentioned example, and a plurality of generated printing objects is stored in the same folder. Further, generally, on the card Ca are often printed printing objects (image data) such as a photograph of face of the owner, a logo mark of the company and background image of the card, and these pieces of image data may be stored in the same folder or may be stored in another folder. In addition, such image data may be retrieved from an image input apparatus 204, or may use image data stored in another computer.

(Generation of Image Object and Setting of Peel Off Region)

The operator generates a desired image to print on the card Ca using a plurality of printing objects stored in the above-mentioned folder. In other words, the higher apparatus 201 displays the entire preview image (also see FIG. 16) on the monitor 202 using the object generation application software, and assists the operator to arrange a plurality of objects. By this means, the operator is capable of obtaining an image object in which the full name of the owner, company name, ID number, photograph of face, logo mark and the like are arranged in desired positions.

As described in the column of background art, on the card Ca exist regions such as a magnetic stripe arrangement area, IC (particularly, contact type IC) storage area and a signature field of an owner to which the transfer layer of the transfer film 46 should not be transferred. In obtaining the desired image object (before the arrangement of a plurality of printing objects, during the arrangement, or after the arrangement), the operator sets (designates) a non-transfer region indicating that the transfer layer of the transfer film 46 is not transferred to the card Ca inside the region of the image object. The printing apparatus 1 side forms the non-transfer region by peeling off the transfer layer of the transfer film 46 using the peel off panel of the ink ribbon 41, and therefore, herein after, the "non-transfer region" is called the peel off region, and is abbreviated as the PO region.

Figure 20A:
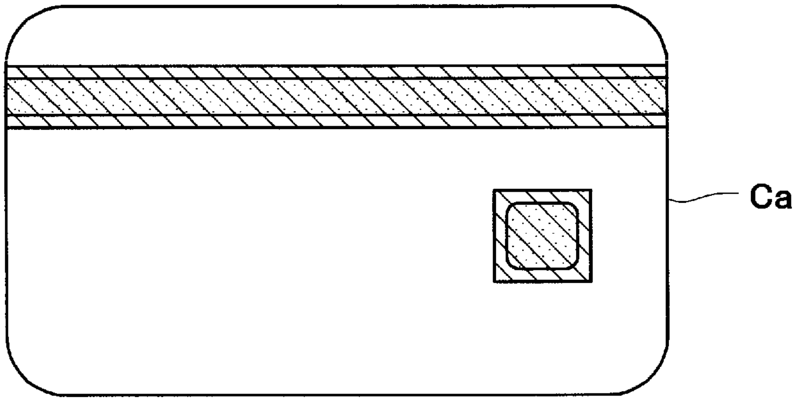
FIGS. 20A to 20C contain explanatory views schematically illustrating the relationship between the PO region and a non-printing area on a card, while showing the PO region by dots and the non-printing region by oblique lines, where

FIG. 20A shows the magnetic stripe arrangement area and contact type IC storage area as the region to which the transfer layer of the transfer film 46 should not be transferred to the card Ca, and shows an example in which the magnetic stripe arrangement area and contact type IC storage area are set for the PO region (region shown by dots) as the non-transfer region, and the inside of a region (region shown by oblique lines) that is larger than the PO region by predetermined dimensions and that includes the PO region at the center is set as a non-printing region in which an image is not formed on the intermediate transfer medium 46. Hereinafter, according to FIG. 20A, the contact type IC storage area will be described mainly.

Figure 16:
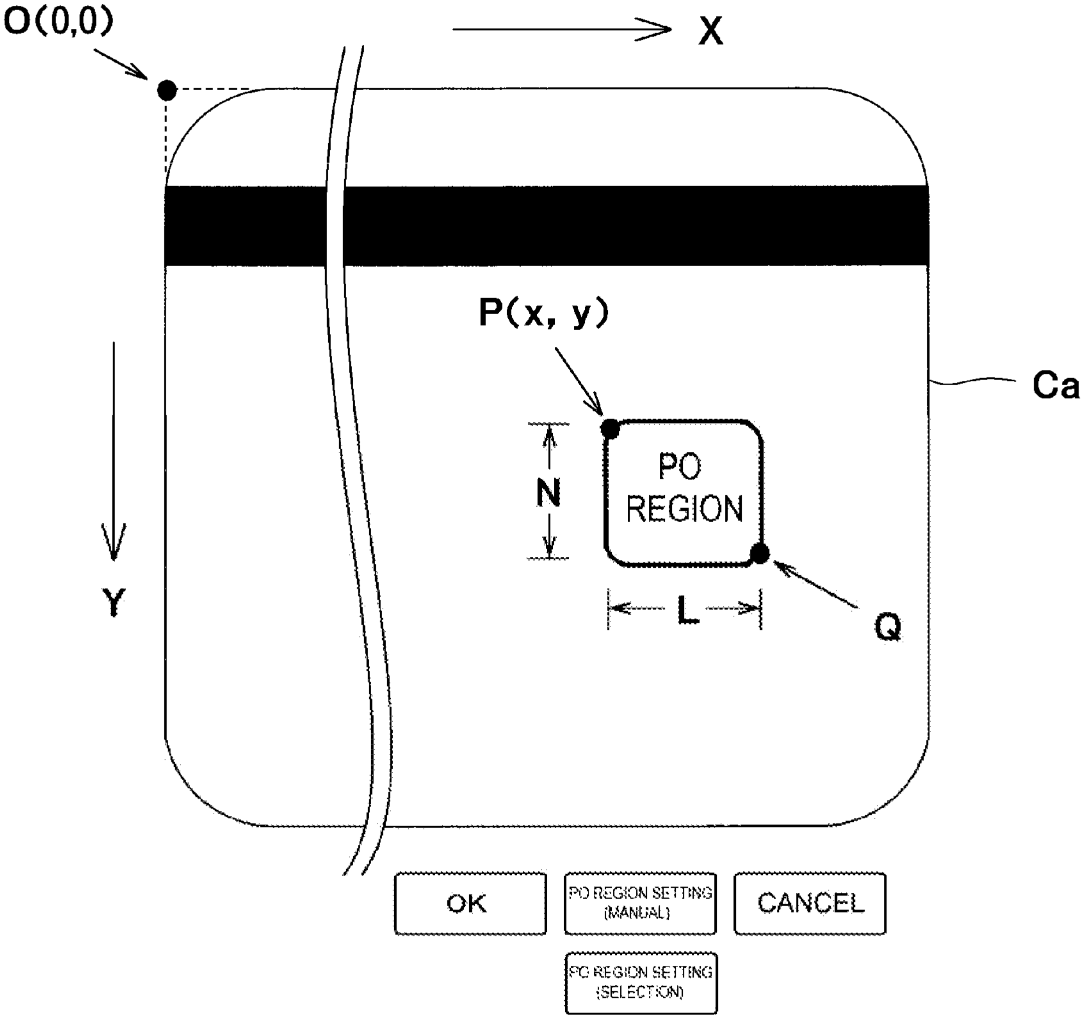
FIG. 16 is an explanatory view schematically showing an example of a screen displayed on the monitor of the higher apparatus in setting a peel off region (PO region) on a storage position of a contact type IC with object generation application software.

FIG. 16 is an explanatory view schematically showing an example of a screen displayed on the monitor 202 of the higher apparatus 201 in setting the PO region on a storage position of the contact type IC with the object generation application software, and shows a preview image before arranging each printing object. In this example, the coordinates of the origin point O (0,0) are set on a position in which the extension line of the upper end of the card Ca crosses the extension line of the left end of the card Ca on both extension lines. The operator sets the upper left coordinates of the storage position of the contact type IC i.e. coordinates of the position closest to the origin point O as peel off start coordinates P(x,y), and further sets a size L in the X-axis direction and size N in the Y-axis direction of the PO region. As a substitute therefor, the operator may set the peel off start coordinates P(x,y) and lower right coordinates of the storage position of the contact type IC i.e. coordinates of a position farthest from the origin point O as a peel off end coordinates Q(x+L, y+N). In this example, since the above-mentioned individual printing object has the size information, as in the processing on the printing object, the peel off start coordinates P(x,y) and size information (L,N) are made the position information of the PO region. The operator similarly makes the setting on the other PO region (for example, magnetic stripe arrangement region).

In the object generation application software of this example, the operator clicks a PO region setting (manual) button to display the PO region of the rectangular predetermined size on the preview screen, is capable of changing optionally the size L in the X-axis direction and size N in the Y-axis of the PO region by positioning a pointer (cursor) in the peel off end coordinates Q of the displayed PO region and arbitrarily left-dragging with the mouse, and is capable of shifting the PO region to an arbitrary position by positioning a pointer in a portion except the peel off end coordinates Q inside the PO region and left-dragging to an arbitrary position with the mouse. In addition, a box indicating numeric values of the peel off start coordinates P, and the size L in the X-axis direction and size N in the Y-axis of the PO region is concurrently displayed (not shown), and the operator is also able to directly change the numeric value inside the box.

The above-mentioned example is the example in the case where the operator sets the PO region manually, and when a standard product is used for the card Ca, it is possible to set easier. For example, the object generation application software has information for defining the relationship between the type of card and the position information (peel off start coordinates P, and the size L in the X-axis direction and size N in the Y-axis of the PO region) of the PO region corresponding to the type of card as program data, and by the operator clicking a PO region setting (selection) button, displays a list (not shown) to specify the type of card Ca. For example, the operator places a checkmark in the box corresponding to the type of card, and thereby specifies (selects) the type of card Ca from the displayed list. The CPU of the higher apparatus 201 determines the position information of the PO region corresponding to the specified type of card Ca by referring to the program data, and displays the PO region on the preview image.

The CPU of the higher apparatus 201 judges whether the OK button of the preview image is clicked, and in the case of being clicked, determines that the image object to print on the card Ca and the peel off data is established. Herein, importance is that each printing object is set for the position information. Accordingly, as well as the above-mentioned printing information, the printing information is provided with the position information of the printing objects. Further, the CPU retrieves the peel off start coordinates P(x,y), and the size information (L, N), and stores the position information of the PO region in a predetermined folder (peel off folder) as peel off data. In addition, the peel off folder may be the same as the folder in which the printing objects are stored.

Next, according to the object generation application software, the CPU of the higher apparatus 201 converts each printing object of the text data into image data such as a bitmap, and generates a single image object into which all image data is integrated for each surface of the card. Then, using the API (Application Program Interface) function, the CPU outputs the image object, the peel off data, and data that is beforehand input from the input apparatus 203 to record on the magnetic stripe and IC of the card Ca to the GDI (Graphic Device Interface, see Japanese Unexamined Patent Publication No. 2004-194041). Using the DDI function (Device Driver Interface, see Japanese Unexamined Patent Publication No. 2002-91428), the GDI outputs the image object, the peel off data, and the data to record on the magnetic stripe and IC of the card Ca to the printer driver.

(Printer Driver)

According to the printer driver, the CPU of the higher apparatus 201 receives the data output from the object generation application software via the GDI, determines various parameter values to control recording operation in the printing apparatus 1, and generates the printing data to perform recording on the card Ca, the peel off data, and the data to record on the magnetic stripe and IC with recording commands to transmit to the printing apparatus 1.

(Image Conversion)]

Described herein is image conversion from the image object into printing data by the printer driver. In this Embodiment, the printer driver performs the following three types of image conversion. 1) Conversion from the image object with R (Red), G (Green) and B (Blue) as color components into the printing data with Y (Yellow), M (Magenta) and C (Cyan)

each as a color component. 2) Edge enhancement conversion (for example, conversion for enhancing the contour of the face and the like) performed in the conversion of above-mentioned 1). 3) Dither conversion on the image object with Bk (Black) as a color component. The dither conversion is performed when ink of the Bk ribbon panel of the ink ribbon 41 is melt-type ink as in this example. Further, in the case where the color ribbon panel of the ink ribbon 41 is of the melt-type (the case except this example), the dither conversion is also performed on the color ribbon panel. In addition, in this Embodiment, in the image conversion of above-mentioned 1), each pixel constituting the printing data of R, G, B, Bk is converted in the 256-level gray scale in the range of gray scale values of 0 to 255.

(Printing Apparatus)

On the other hand, the buffer memory 101 of the control section 100 in the printing apparatus 1 stores various parameter values that are recording control commands, the printing data, the peel off data and the data to record on the magnetic stripe and IC.

(Generation of Modified Printing Data)

The CPU (herein after, simply referred to as CPU) of the microcomputer 102 of the control section 100 executes a modified printing data generation routine to generate modified printing data with modification made to the received printing data, based on the printing data and peel off data stored in the buffer memory 101.

Figure 17:
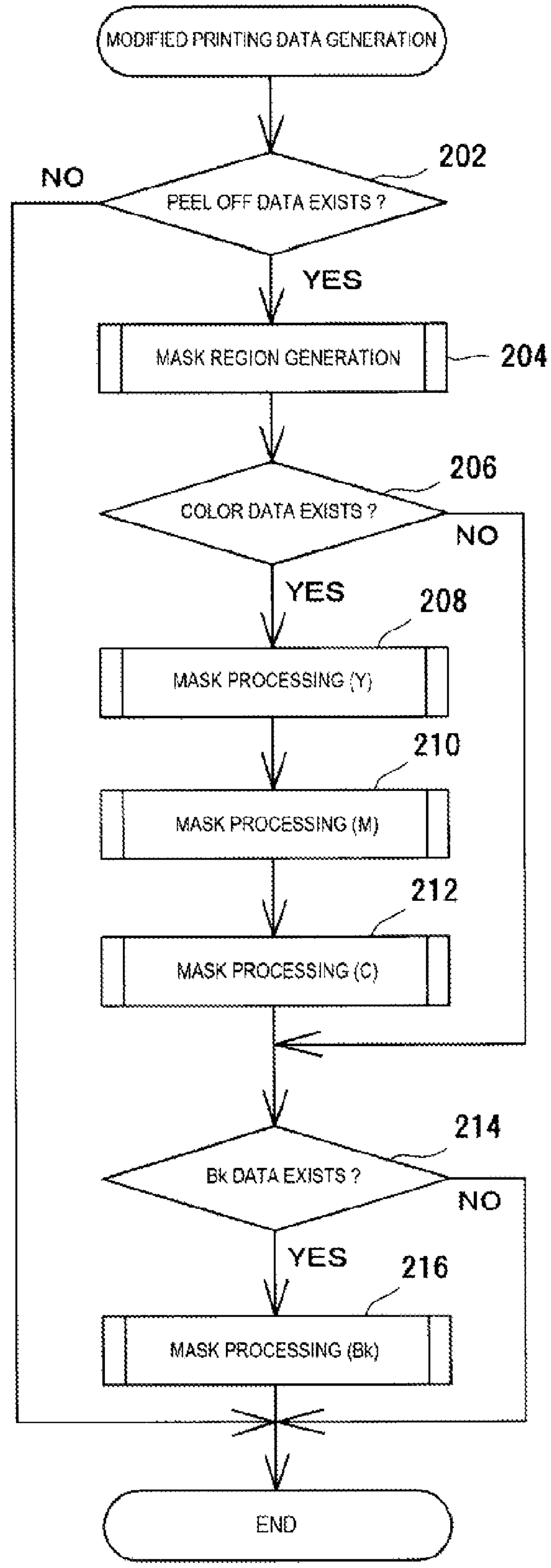
FIG. 17 is a flowchart of a modified printing data generation routine executed by a CPU of a microcomputer of the control section in the printing apparatus.

As shown in FIG. 17, in the modified printing data generation routine, first, in step 202 it is determined whether or not the peel off data exists, and in a negative determination, the modified printing data generation routine is finished. In a positive determination, in next step 204, the CPU performs mask region generation processing.

Figure 18:
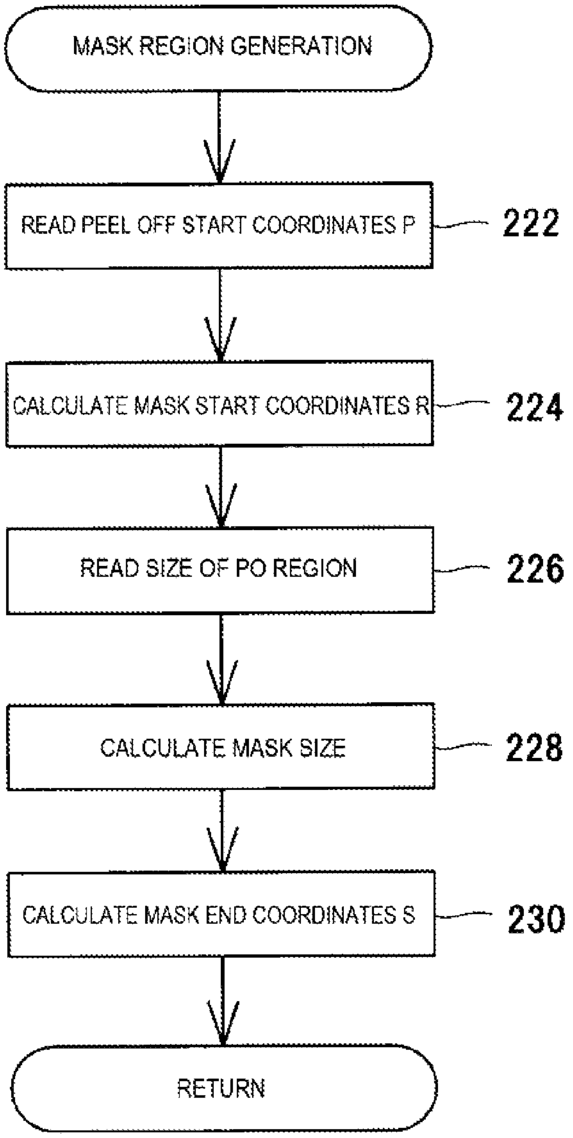
FIG. 18 is a flowchart of a mask region generation subroutine illustrating details of step 204 of the modified printing data generation routine.
Figure 21:
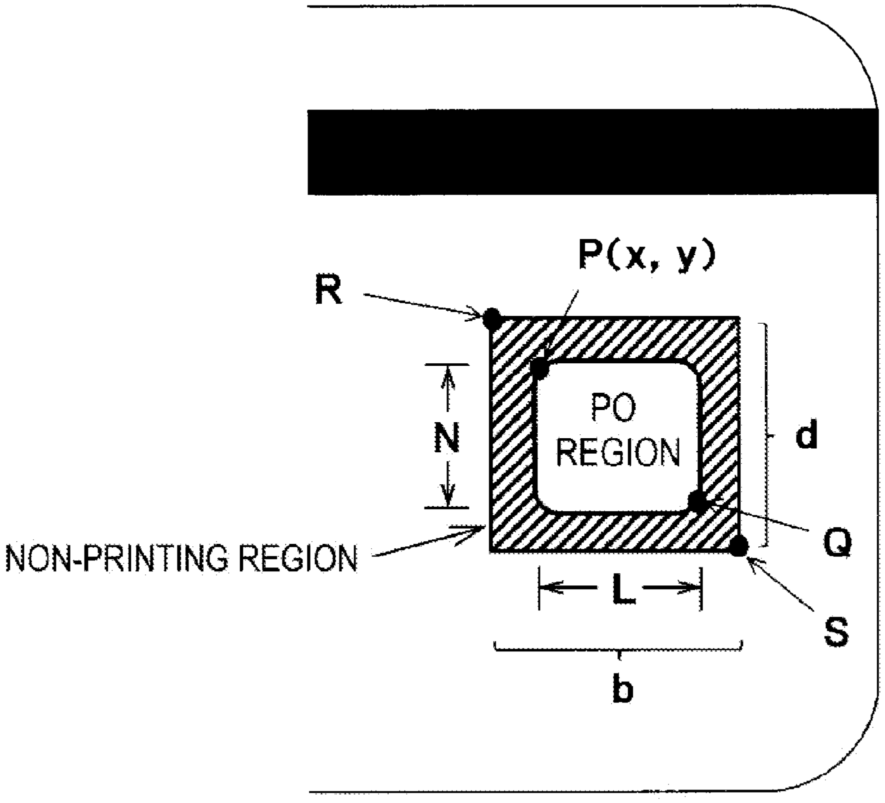
FIG. 21 is an explanatory view schematically illustrating the PO region, non-printing region and a position of each coordinate on the card.

As shown in FIG. 18, in the mask region generation processing, in step 222, the CPU reads the peel off start coordinates P(x,y) from the peel off data (also see FIG. 21), and in next step 224, calculates mask start coordinates R. In this example, as described above, since the region (region shown by oblique lines in FIG. 20A) that is larger than the PO region by predetermined dimensions and that includes the PO region at the center is set as a non-printing region in which an image is not formed on the intermediate transfer medium 46, as shown in FIG. 21, the mask start coordinates R(a, c) are calculated as a position spaced a predetermined dimension (0.5 mm in this example) away from the peel off start coordinates P(x,y) in the direction of the origin point O in each of the X axis and Y axis (left side and upper side in FIG. 21) (R(a,c)=R(x−0.5, y−0.5)).

Next, in step 226, the CPU reads the size information (L, N) of the PO region from the peel off data, and calculates the peel off end coordinates Q (x+L,y+N) from the size information. Next, in step 228, the CPU calculates the size (b,d) in the X-axis and Y-axis directions of the non-printing region (size (b,d)=size (L+1,N+1)). The non-printing region undergoes mask processing described later, and therefore, herein after, the size in the X-axis and Y-axis directions of the non-printing region is referred to as the mask size. Then, in step S230, the CPU calculates the mask end coordinates S (a+b,c+d) expressed as the coordinates of a position farthest from the origin point O (0,0) in the non-printing region, from the mask start coordinates R calculated in step 224, and the mask size (b,d) calculated in step 228, finishes the mask region generation subroutine, and proceeds to step S206 in FIG. 17.

In step 206 in FIG. 17, referring to various parameter values (or printing data), the CPU determines whether or not printing data of colors (printing data with Y, M and C as color components) exists, and in a negative determination, proceeds to step 214. In a positive determination, in steps 208 to 212, the CPU performs the mask processing to generate the non-printing region for each printing data with Y, M and C as color components.

Figure 19:
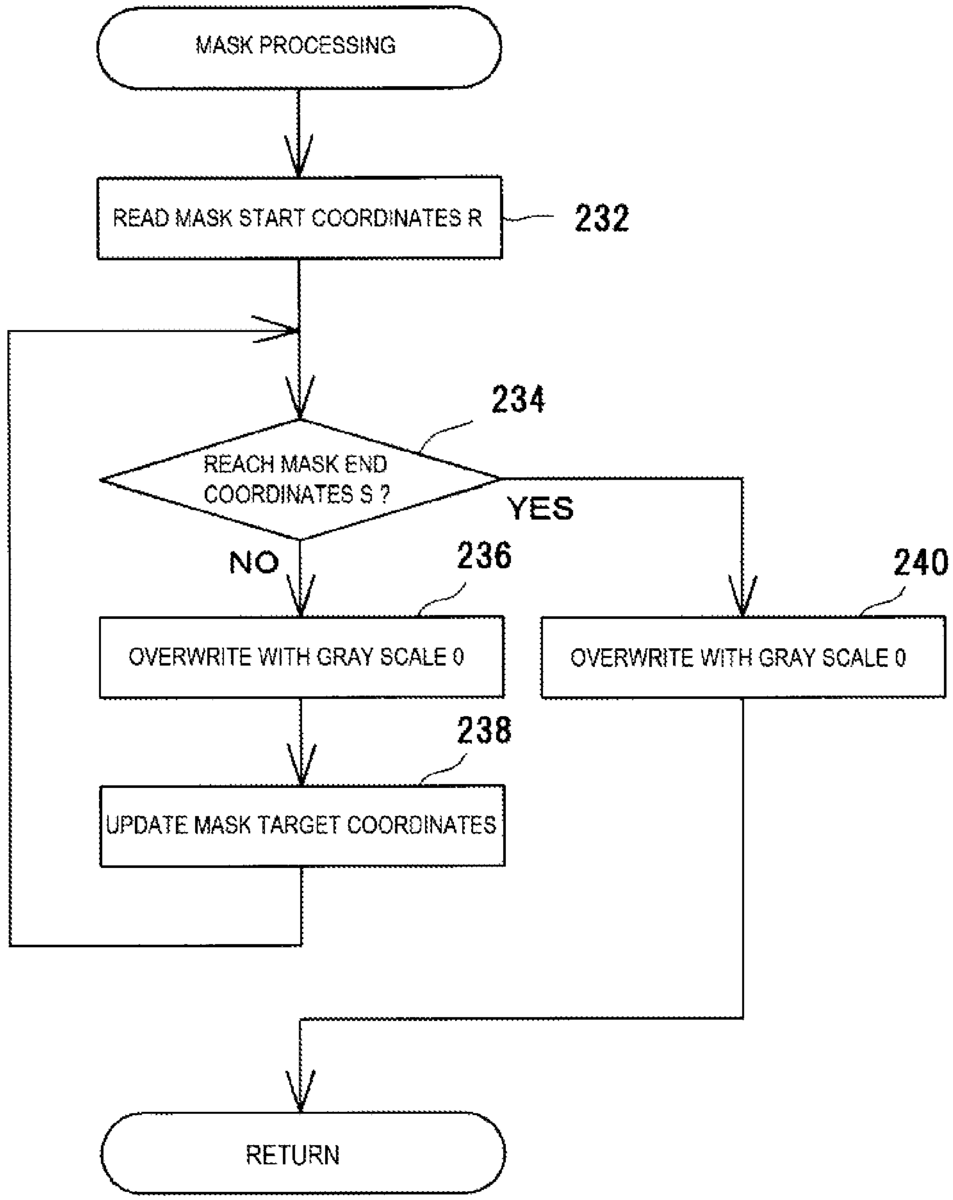
FIG. 19 is a flowchart of the mask processing subroutine illustrating details of steps 208, 210, 212 and 216 of the modified printing data generation routine.

As shown in FIG. 19, in the mask processing, in step 232, the CPU reads the mask start coordinates R calculated in step 226 (see FIG. 18), in next step 234 determines whether or not to reach the mask end coordinates S, and in a positive determination, overwrites the gray-scale value of the pixel of the mask end coordinates S with a gray-scale value of 0 to finish the mask processing subroutine. In a negative determination, in next step 236, the CPU overwrites the gray-scale value of the pixel of the mask start coordinates R with a gray-scale value of 0. Next, in step 238, the CPU updates the mask target coordinates inside the non-printing region, and returns to step 234. By this means, as shown in FIG. 21, with respect to each printing data with Y, M and C as color components, modified printing data is generated in which a gray-scale value of 0 is set on gray-scale values of the printing data inside the non-printing region including the PO region.

Next, in step 214 in FIG. 17, referring to various parameter values (or printing data), the CPU determines whether or not printing data of Bk exists, and in a negative determination, finishes the modified printing data generation routine. In a positive determination, in step 216, the CPU performs the mask processing to generate the non-printing region for the printing data with Bk as a color component (also see FIG. 21). The mask processing is the same as the mask processing (see FIG. 19) on the printing data with Y, M and C as color components, and therefore, the description thereof is omitted.

The above-mentioned description is for the contact type IC storage area, and as in this example, when the peel off data of the stripe arrangement area exists, further when the signature field of the owner of the card Ca and the like exist, the printing data is similarly modified. FIG. 20 shows an example of deleting (overwriting with a gray-scale value of 0 in the mask processing) printing data inside the regions that respectively include the contact type IC storage area and stripe arrangement area at the center and that are larger than the areas by predetermined dimensions for the contact type IC storage area and stripe arrangement area, and the deleted areas are shown by oblique lines.

In addition, in this Embodiment, the processing is performed in the order of generation of image object and setting of PO region→image conversion→generation of modified printing data, and in theory, it is conceivable to process in the order of generation of image object and setting of PO region→generation of modified printing data→image conversion. In the latter case, generation of modified printing data is performed on only two objects, color image object and Bk image object, and as compared with the former case where the processing is performed on the printing data of each of Y, M, C and Bk and is performed total four times (see steps 208, 210, 212, and 216 in FIG. 17), it is considered that the processing load is smaller. However, in the latter case, since generation of modified printing data is performed before image processing and the original image is lost, in image conversion (particularly, in the above-mentioned dither conversion and edge enhancement conversion), there is the risk that a finish on the boundary portion of the non-printing region is inferior. In contrast thereto, in the former case, only by setting a gray-scale of 0 on gray-scale values of pixels inside the non-printing region for the generated printing data, the boundary portion of the non-printing region is finished neatly. Therefore, in this Embodiment, by the former procedure, the image quality is improved in the image formed on the card Ca.

(Image Formation on the Transfer Film 46)

Figure 22:
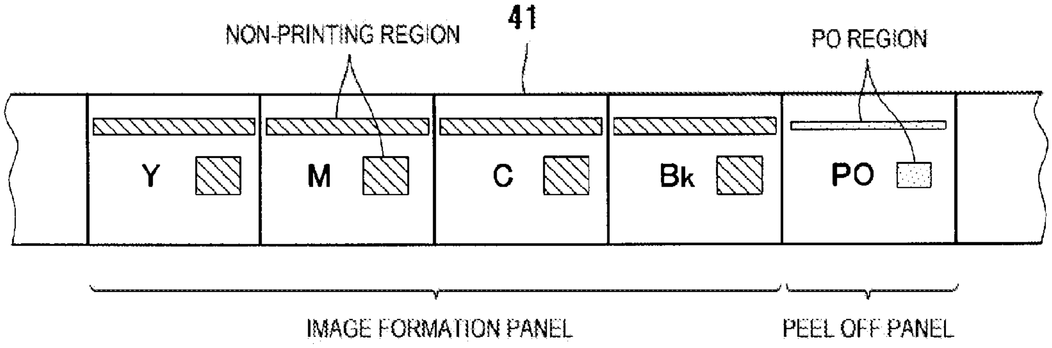
FIG. 22 is an explanatory view schematically illustrating the non-printing regions in an image formation panel and the PO regions of a peel off panel in an ink ribbon.

According to the modified printing data of each of Y, M, C and Bk generated in the modified printing data generation routine, for the image formation panel of each of color ribbon panels of Y, M and C and Bk ribbon panel of the ink ribbon 41, the printing section B1 selectively heats the heating elements of the thermal head 40 to form an image. As shown in FIG. 22, in each image formation panel of the ink ribbon 41, the printing data of the non-printing region shown by oblique lines is set for a gray-scale value of 0, and is not heated with the heating elements, and as a result, image formation with each ink of Y, M, C and Bk is not performed on the transfer film 46.

(Peeling of the Transfer Layer of the Transfer Film 46)

Next, according to the position information of the PO region, for the peel off panel (PO) of the ink ribbon 41, the printing section B1 selectively heats the heating elements of the thermal head 40, and thereby peels off the transfer layer of the region corresponding to the PO region on the ink ribbon 41 of the transfer film 46. FIG. 22 shows the PO regions on the peel off panel (PO) by dots. Since the transfer film 46 is in a state in which the film 46 is nipped with the thermal head 40 and platen roller 45 together with the ink ribbon 41 and is transported in the sub-scanning direction, by selectively heating the PO regions of ink ribbon 41 shown by dots with the heating elements lined in the main scanning direction, the transfer layer of the corresponding regions of the transfer film 46 is peeled off (see FIG. 23C).

(Transfer to the Card Ca)

The transfer section B2 transfers the image with the transfer layer peeled formed on the transfer film 46 as described above to the card Ca. By this means, the printing processing on one surface of the card Ca is finished. In addition, in transferring images to both surfaces of the card Ca, for example, after transferring an image to one surface of the card Ca, the card Ca may be transported backward toward the reverse unit F on the medium transport path P1, and rotated 180° in the reverse unit F to transfer an image to the other surface of the card Ca. Alternatively, after transferring an image to one surface of the card Ca, the card Ca may be carried to the storage stacker 60 (once discharged from the printing apparatus 1) along the medium transport path P2 to perform the printing processing again on the other surface of the card Ca.

(Advantages and Others)

Advantages and others of the printing system 200 of this Embodiment will be described next while comparing with the problems of the conventional example.

Figure 23A:
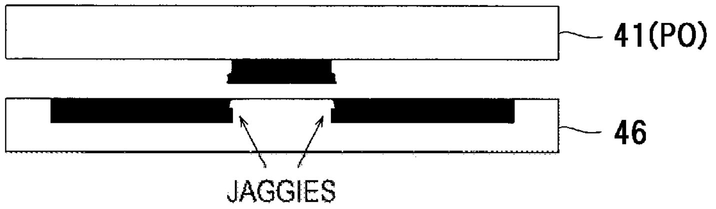
FIGS. 23A to 23F contain explanatory views schematically illustrating cross-sectional states in peeling off a transfer layer of a transfer film, where
Figure 23B:
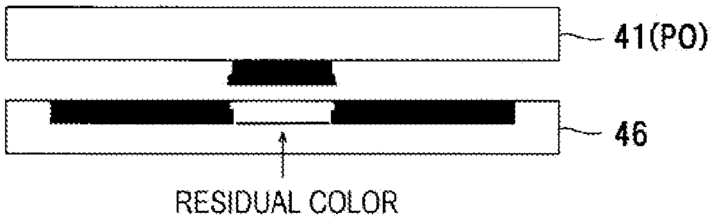

In the conventional example, since an image is once formed also in a predetermined region of the transfer film 46 that should not be transferred to a card using the image formation panel of Y, M, C and Bk of the ink ribbon 41, and the transfer layer of the predetermined region is peeled off with the peel off panel (PO), as shown in FIG. 23A, there is the risk that jaggies occur on boundaries with images in the periphery of the peeled region (Problem 1). Further, as shown in FIG. 23B, as the level of gray scale of Y, M, C and Bk printed on the PO region is higher (color is denser), the transfer layer is not completely peeled off with the peel off panel (PO), and there is the risk that a color is left in the region corresponding to the PO region of the transfer film 46 (Problem 2).

Figure 23C:
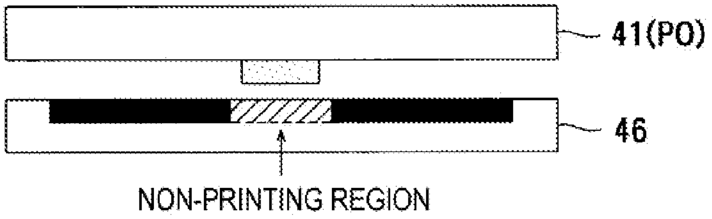

In the printing system 200 of this Embodiment, in the modified printing data, pixels of the printing data of the non-printing region are set (deleted) for a gray-scale value of 0. Therefore, as shown in FIG. 23C, when the printing section B1 forms an image on the transfer film 46 with the image formation panel, image formation with the image formation panel is not performed in the region of the transfer film 46 corresponding to the non-printing region in which the printing data is set for a gray-scale value of 0. Then, when the printing section B1 peels off the transfer layer of the transfer film 46 with the peel off panel (PO) of the ink ribbon 41, since the region of the peeled transfer layer is smaller than the non-printing region, image formation is not performed in the periphery of the region of the peeled transfer layer, the region to peel off with the peel off panel (PO) is made easy to peel off, it is possible to prevent (solve Problem 1) the occurrence of jaggies on boundaries with images in the periphery of the peeled region, and it is possible to improve the image quality of the card Ca after the transfer section B2 transfers the image formed on the transfer film 46. Further, since image formation with the image formation panel is not performed in the region of the transfer film 46 corresponding to the non-printing region in which the printing data is set for a gray-scale value of 0, such a problem does not arise that a color is left in the region corresponding to the PO region of the transfer film 46 (it is possible to solve Problem 2.)

Modifications of this Embodiment will be described next.

(Modification 1)

Figure 20B:
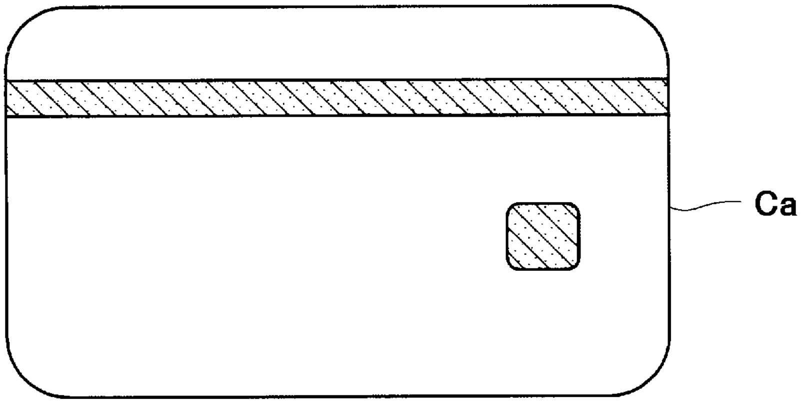
Figure 23D:
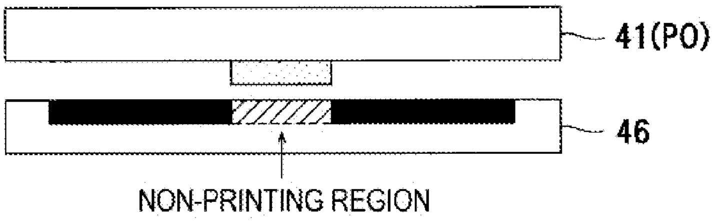

As shown in FIGS. 20B and 23D, the non-printing region and the PO region may set at the same region. In this Modification 1, when the printing section B1 peels off the transfer layer of the transfer film 46 with the peel off panel (PO) of the ink ribbon 41, since the region of the peeled transfer layer is the same as the region in which an image is not formed, image formation is not performed in the region of the peeled transfer layer, the region to peel off with the peel off panel (PO) is made easy to peel off, it is possible to prevent (solve Problem 1) the occurrence of jaggies on boundaries with images in the periphery of the peeled region, and it is possible to improve the image quality of the card Ca after the transfer section B2 transfers the image formed on the transfer film 46. Further, since image formation with the image formation panel is not performed in the region of the transfer film 46 corresponding to the non-printing region in which the printing data is set for a gray-scale value of 0, such a problem does not arise that a color is left in the region corresponding to the PO region of the transfer film 46 (it is possible to solve Problem 2.)

(Modification 2)

Figure 20C:
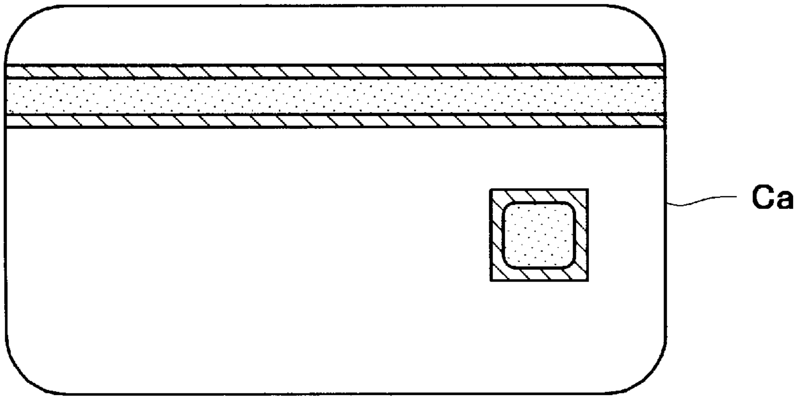
Figure 23E:
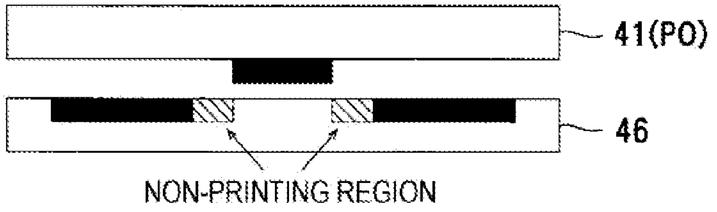

Further, as shown in FIGS. 20C and 23E, the non-printing region may be set only in the periphery of the PO region (an image is formed in a region of the transfer film 46 corresponding to the PO region as in the conventional example). In this Modification 2, when the printing section B1 peels off the transfer layer of the transfer film 46 with the peel off panel (PO) of the ink ribbon 41, since the region of the peeled transfer layer is adjacent to the regions in which an image is not formed, image formation is not performed in the regions in the periphery of the peeled transfer layer, the region to peel off with the peel off panel (PO) is made easy to peel off, it is possible to prevent (solve Problem 1) the occurrence of jaggies on the boundaries with images in the periphery of the peeled region, and it is possible to improve the image quality of the card Ca after the transfer section B2 transfers the image formed on the transfer film 46. However, since the image is formed in the region of the intimidate film 46 corresponding to the PO region, it is not possible to solve Problem 2 as in the conventional example. As can be seen by comparing FIG. 20B with FIG. 20C, with respect to the non-printing region and the PO region, it is possible to regard this Embodiment shown in FIG. 20A as overlapping FIG. 20B and FIG. 20C.

(Modification 3)

Figure 23F:
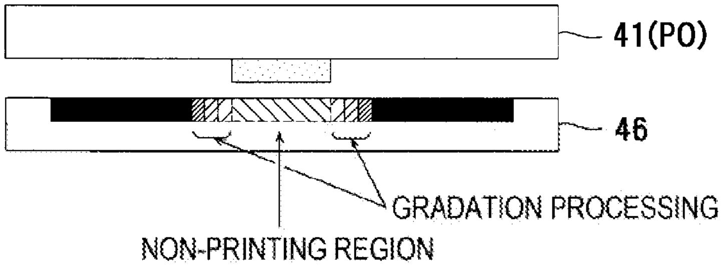

Further, in the aspect (this Embodiment) as shown in FIG. 20A, gradation processing may be performed on the region of oblique lines as shown in FIG. 20C. In other words, the gradation processing may be performed on the region (that is the region larger than the PO region by predetermined dimensions and that does not include the PO region) shown by oblique lines of FIG. 21. FIG. 23F illustrates the cross section. It is possible to perform the gradation processing by gradually or stepwise decreasing gray-scale values of the printing data on a boundary of the region adjacent to the side opposite to the PO region of the region larger than the PO region by predetermined dimensions toward a gray-scale of 0 that is the modified gray-scale value. In this Modification 3, as in Modification 1, it is possible to solve Problems 1 and 2, and also to make a truer finish i.e. improve the image quality by the gradation processing.

In addition, this Embodiment shows the ink ribbon 41 formed by repeating the image formation panel of Y, M, C and Bk and the peel off panel (PO) in this order in a face sequential manner, but the invention is not limited thereto. For example, the ink ribbon 41 may be formed by repeating the peel off panel (PO) and the image formation panel of Y, M, C and Bk in this order in a face sequential manner. In this case, in a manner opposite to this Embodiment in which the transfer layer of the transfer film 46 is peeled off with the peel off panel after forming an image on the transfer film 46 with the image formation panel, it is possible to peel off the transfer layer of the transfer film 46 with the peel off panel (PO) before forming an image on the transfer film 46 with the image formation panel. Further, the ribbon may have a protection layer and the like as well as the image formation panel of Y, M, C and Bk and the peel off panel (PO). Furthermore, this Embodiment shows the example in which color ribbon panels are in the order of Y, M and C, and as long as the ribbon has at least above-mentioned three colors, it is possible to change the order as appropriate. Moreover, the ribbon may have ribbon panels of other colors (for example, silver and gold).

Further, this Embodiment shows the example in which the higher apparatus 201 side performs generation of the image object, setting of the PO region and image conversion, and the printing apparatus 1 side performs generation of the modified printing data, and since the printing apparatus 1 is provided with the operation panel section 5, the printing apparatus 1 side may perform generation of the image object and setting of the PO region. In addition, with consideration given to operability, processing speed and the like, it is preferable that the higher apparatus 201 side performs such processing. Furthermore, image conversion may be performed in the printing apparatus 1. Still furthermore, generation of the modified printing data is performed on the printing apparatus 1 side when image conversion is performed on the printing apparatus 1 side. When image conversion is performed on the higher apparatus 201 side, the generation may be performed on either the printing apparatus 1 side or the higher apparatus 201 side.

Moreover, in the case of applying the present invention to the printing apparatus 1, it is always not necessary that the printing apparatus 1 is connected to the higher apparatus 201 as in this Embodiment. For example, when the printing data, the position information of the PO region and the like is input to the printing apparatus 1 via a storage medium such as USB memory, it is possible to perform the same processing as in this Embodiment.

Further, this Embodiment describes the example of setting the non-printing region as the region that is larger than the PO region by predetermined dimensions and that includes the PO region at the center, but the invention is not limited thereto, and a region that is larger than the PO region by predetermined dimensions and includes the PO region may be set as the non-printing region. In this case, an intersection point (center) of virtual lines of diagonal lines of the rectangular non-printing region and an intersection point (center) of virtual lines of diagonal lines of the rectangular PO region are different positions. Moreover, this Embodiment exemplifies 0.5 mm in each of the X-axis direction and Y-axis direction as predetermined dimensions, but the invention is not limited thereto, and for example, the dimension may be different between the X-axis direction and the Y-axis direction such as 0.4 mm in the X-axis direction and 0.6 mm in the Y-axis direction.

Furthermore, as shown in FIG. 20A, this Embodiment shows the example of setting the region that is larger than the PO region by predetermined dimensions and that includes the PO region at the center, and the object generation application software may be programmed so that the operator selects one from among the setting examples of this Embodiment and Modifications 1 to 3.

Then, this Embodiment shows the example in which the platen roller 45 is shifted to the thermal head 40 side to nip the ink ribbon 41 and transfer film 46, but the present invention is not limited thereto. For example, the thermal head 40 may be shifted to the platen roller 45 side to nip the ink ribbon 41 and transfer film 46. Further, this Embodiment exemplifies the platen roller 45 disposed opposite the thermal head 40, but the present invention is not limited to a roller or rotating body-shaped platen. For example, a cradle-shaped platen, plate-shaped platen and the like may be used which receive the pressing force from the thermal head 40.

Further, this Embodiment shows the aspect of modifying gray-scale values of the printing data to a gray-scale value of 0 in the non-printing region, and instead of modifying gray-scale values to a gray-scale value of 0, modification may be made to a range of gray-scale values in which the ink ribbon 41 does not produce a color. In the printing apparatus of this Embodiment, since the ink ribbon does not produce a color at a gray-scale value of about 20, in the mask processing in FIG. 19, by modifying gray-scale values of the printing data in the non-printing regain to a value of 20 or less, it is also possible to obtain the same effect. Since the gray-scale value of the degree that the ink ribbon does not produce a color varies with performance of the printing apparatus, and therefore, it is desirable to set as appropriate. In addition, by driving the thermal head 40 to an extent of not producing a color, there is the effect of preliminary heating on the thermal head 40, and the thermal head 40 is not cooled.

Industrial Applicability

In addition, this application claims priority from Japanese Patent Application No. 2013-159039 incorporated herein by reference.

The invention claimed is:

1. A printing system provide with a printing apparatus that forms an image on an intermediate transfer medium using an ink ribbon in which are disposed an image formation panel and a peel off panel and that transfers the image to a printing medium, and a host computer, comprising:

an object generation/non-transfer region setting device for generating a desired image object corresponding to the printing medium, and setting a non-transfer region indicating that a transfer layer of the intermediate transfer medium is not transferred to the printing medium inside a region of the image object;

a converting device for converting the image object generated in the object generation/non-transfer region setting device into printing data;

a modified printing data generating device for generating modified printing data by modifying, in the printing data converted in the converting device, a gray-scale value of printing data inside the non-transfer region set by the object generation/non-transfer region setting device, printing data inside a region that is larger than the non-transfer region by a predetermined dimension and that includes the non-transfer region, or printing data of a region larger than the non-transfer region by a predetermined dimension to a predetermined gray-scale value or less, or modifying a gray-scale value of the printing data inside the non-transfer region to a predetermined gray-scale value or less while performing gradation processing in a region larger than the non-transfer region by a predetermined dimension;

a printing section that has a thermal head with a plurality of heating elements lined and that peels off a transfer layer of the intermediate transfer medium by selectively heating the heating elements for the peel off panel according to position information of the non-transfer region set by the object generation/non-transfer region setting device, after forming an image on the intermediate transfer medium by selectively heating the heating elements for the image formation panel according to the modified printing data generated in the modified printing data generating device or before forming the image; and a transfer section that transfers, to the printing medium, an image with the transfer layer peeled off formed on the intermediate transfer medium in the printing section.

2. The printing system according to claim 1, wherein the modified printing data generating device modifies the gray-scale value of the printing data inside the non-transfer region, the printing data inside the region that is larger than the non-transfer region by a predetermined dimension and that includes the non-transfer region, or the printing data of the region larger than the non-transfer region by a predetermined dimension to a gray-scale value of 0.

3. The printing system according to claim 1, wherein the modified printing data generating device performs the gradation processing by setting a gray-scale value of printing data on a boundary of the region adjacent to the side opposite to the non-transfer region of the region larger than the non-transfer region by a predetermined dimension to be smaller toward the modified gray-scale value gradually or stepwise.

4. The printing system according to claim 1, further comprising:

a storage device for beforehand storing a relationship between a type of recording medium and the non-transfer region corresponding to the type of recording medium, wherein the object generation/non-transfer region setting device sets the non-transfer region from the relationship stored in the storage device corresponding to the type of recording medium.

5. The printing system according to claim 1, wherein in the ink ribbon are disposed the image formation panel having a plurality of color panels and a Bk (Black) panel and the peel off panel, and the converting device converts the image object with R (Red), G (Green) and B (Blue) as color components into the printing data with Y (Yellow), M (Magenta) and C (Cyan) each as a color component, and performs dither conversion on the image object with Bk as a color component.

6. The printing system according to claim 5, wherein the converting device further performs edge enhancement conversion in converting into the printing data with Y, M and C each as a color component.

7. A printing apparatus that forms an image on an intermediate transfer medium using an ink ribbon in which are disposed an image formation panel and a peel off panel and that transfers the image to a printing medium, comprising:

a storage device for storing input printing data and position information of a non-transfer region indicating that a transfer layer of the intermediate transfer medium is not transferred to the printing medium corresponding to the printing data;

a modified printing data generating device for generating modified printing data by modifying, in the printing data stored in the storage device, a gray-scale value of printing data inside the non-transfer region, printing data inside a region that is larger than the non-transfer region by a predetermined dimension and that includes the non-transfer region, or printing data of a region larger than the non-transfer region by a predetermined dimension to a predetermined gray-scale value or less, or modifying a gray-scale value of the printing data inside the non-transfer region to a predetermined gray-scale value or less while performing gradation processing in a region larger than the non-transfer region by a predetermined dimension, according to the position information of the non-transfer region stored in the storage device;

a printing section that has a thermal head with a plurality of heating elements lined and that peels off a transfer layer of the intermediate transfer medium by selectively heating the heating elements for the peel off panel according to the position information of the non-transfer region stored in the storage device, after forming an image on the intermediate transfer medium by selectively heating the heating elements for the image formation panel according to the modified printing data generated in the modified printing data generating device or before forming the image; and a transfer section that transfers, to the printing medium, an image with the transfer layer peeled off formed on the intermediate transfer medium in the printing section.

* * * * *